United States Patent
Armacanqui et al.

(10) Patent No.: US 11,133,497 B2
(45) Date of Patent: Sep. 28, 2021

(54) ALKALINE CELL WITH IMPROVED DISCHARGE EFFICIENCY

(71) Applicant: Energizer Brands, LLC, St. Louis, MO (US)

(72) Inventors: M. Edgar Armacanqui, Madison, WI (US); Wen Li, Madison, WI (US); Donald Raymond Crowe, Dodgeville, WI (US); Andrew J. Roszkowski, Waunakee, WI (US); John Hadley, Madison, WI (US); Janna Rose, Oregon, WI (US)

(73) Assignee: Energizer Brands, LLC, St. Louis, MO (US)

( * ) Notice: Subject to any disclaimer, the term of this patent is extended or adjusted under 35 U.S.C. 154(b) by 36 days.

(21) Appl. No.: 15/573,427

(22) PCT Filed: May 12, 2016

(86) PCT No.: PCT/US2016/032202
§ 371 (c)(1),
(2) Date: Nov. 10, 2017

(87) PCT Pub. No.: WO2016/183373
PCT Pub. Date: Nov. 17, 2016

(65) Prior Publication Data
US 2018/0114978 A1    Apr. 26, 2018

Related U.S. Application Data

(60) Provisional application No. 62/160,870, filed on May 13, 2015.

(51) Int. Cl.
*H01M 4/36* (2006.01)
*H01M 4/62* (2006.01)
(Continued)

(52) U.S. Cl.
CPC ............ *H01M 4/364* (2013.01); *H01M 4/06* (2013.01); *H01M 4/38* (2013.01); *H01M 4/42* (2013.01);
(Continued)

(58) Field of Classification Search
CPC .......... H01M 4/364; H01M 4/38; H01M 4/06; H01M 4/42; H01M 6/06; H01M 4/62; H01M 2004/023; H01M 6/085
See application file for complete search history.

(56) References Cited

U.S. PATENT DOCUMENTS 3,623,911 A * 11/1971 Oswin .................... H01M 4/42
                                                                429/406
4,195,120 A    3/1980 Rossler et al.
(Continued)

FOREIGN PATENT DOCUMENTS

JP    H02-267856 A    11/1990
JP    07-032015 B2    4/1995
(Continued)

OTHER PUBLICATIONS

Deyang Qu "Behavior of Dinonylphenol Phosphate Ester and its influence on the oxidation of a Zn anode in alkaline solution." Journal of Power Sources 162 (2006) 706-712 (Year: 2006).*

(Continued)

*Primary Examiner* — Michael L Dignan
(74) *Attorney, Agent, or Firm* — Alston & Bird LLP

(57) ABSTRACT

A gelled anode for an alkaline electrochemical cell contains zinc-based particles, an alkaline electrolyte, a gelling agent, and two or more additives selected from the group consisting of an alkali metal hydroxide, an organic phosphate ester surfactant, a metal oxide, and tin, which as reduced cell gassing properties relative to cells lacking such additives.

16 Claims, 24 Drawing Sheets

(51) Int. Cl.
*H01M 4/06* (2006.01)
*H01M 6/06* (2006.01)
*H01M 4/42* (2006.01)
*H01M 4/38* (2006.01)
H01M 6/08 (2006.01)
H01M 4/02 (2006.01)

(52) U.S. Cl.
CPC .............. *H01M 4/62* (2013.01); *H01M 6/06* (2013.01); *H01M 6/085* (2013.01); *H01M 2004/023* (2013.01)

(56) References Cited

U.S. PATENT DOCUMENTS

| | | | | |
|---|---|---|---|---|
| 4,372,823 | A | * | 2/1983 | Church ................ H01M 4/244 205/333 |
| 4,777,100 | A | * | 10/1988 | Chalilpoyil ............. H01M 4/38 429/206 |
| 5,721,068 | A | * | 2/1998 | West ....................... H01M 4/12 29/623.1 |
| 5,814,419 | A | | 9/1998 | Kenyon et al. |
| 6,251,539 | B1 | * | 6/2001 | Brys ....................... H01M 4/02 429/206 |
| 6,265,105 | B1 | | 7/2001 | Tokuda et al. |
| 6,387,569 | B1 | * | 5/2002 | Licht ..................... H01M 4/364 429/209 |
| 2004/0033418 | A1 | | 2/2004 | Armacanqui et al. |
| 2004/0072070 | A1 | * | 4/2004 | Miyamoto .......... H01M 2/0235 429/223 |
| 2005/0058902 | A1 | * | 3/2005 | Wang .................. H01M 50/409 429/220 |
| 2007/0117023 | A1 | | 5/2007 | Takamura et al. |
| 2009/0181293 | A1 | | 7/2009 | Kato et al. |
| 2009/0263720 | A1 | | 10/2009 | Nunome et al. |
| 2010/0178538 | A1 | * | 7/2010 | Durkot .................... H01M 4/32 429/50 |
| 2012/0009465 | A1 | * | 1/2012 | Kato ................... H01M 2/0235 429/166 |
| 2013/0171482 | A1 | * | 7/2013 | Phillips .................. H01M 4/26 429/53 |
| 2014/0205909 | A1 | * | 7/2014 | Yonehara ................ H01M 4/42 429/302 |
| 2014/0227592 | A1 | * | 8/2014 | Sarkas ..................... H01M 4/42 429/211 |
| 2015/0037627 | A1 | | 2/2015 | Armacanqui et al. |
| 2015/0372317 | A1 | * | 12/2015 | Pozin ..................... H01M 4/50 702/63 |

FOREIGN PATENT DOCUMENTS

| | | |
|---|---|---|
| JP | 2004-508686 A | 3/2004 |
| JP | 2008-010250 A | 1/2008 |
| JP | 2009-158393 A | 7/2009 |
| JP | 2009-164079 A | 7/2009 |
| JP | 2009-259707 A | 11/2009 |
| JP | 2012-514838 A | 6/2012 |
| WO | WO 02/21615 A2 | 3/2002 |
| WO | WO 2010/083175 A1 | 7/2010 |

OTHER PUBLICATIONS

International Preliminary Report on Patentability of International Application No. PCT/US2016/032202 dated Nov. 23, 2017 (9 pages).

International Search Report and Written Opinion of International Application No. PCT/US2016/032202 dated Aug. 22, 2016 (12 pages).

Japan Patent Application No. 2017-559091, Office Action dated Feb. 10, 2020.

* cited by examiner

LR20 Hift, Toy, & Boom Box performance after high temp. storage.
(1WK 71.1 °C Hift, 2 Wks 54.4 °C Hift, 2 Wks 54.4 °C Toy, 2 Wks 54.4 °C 600 mA H/D)

FIG. 23
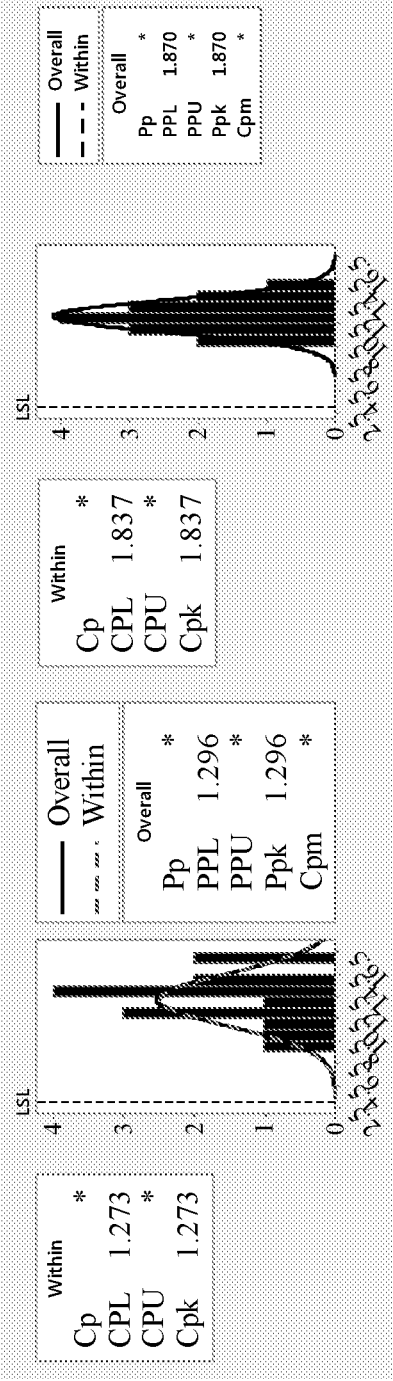
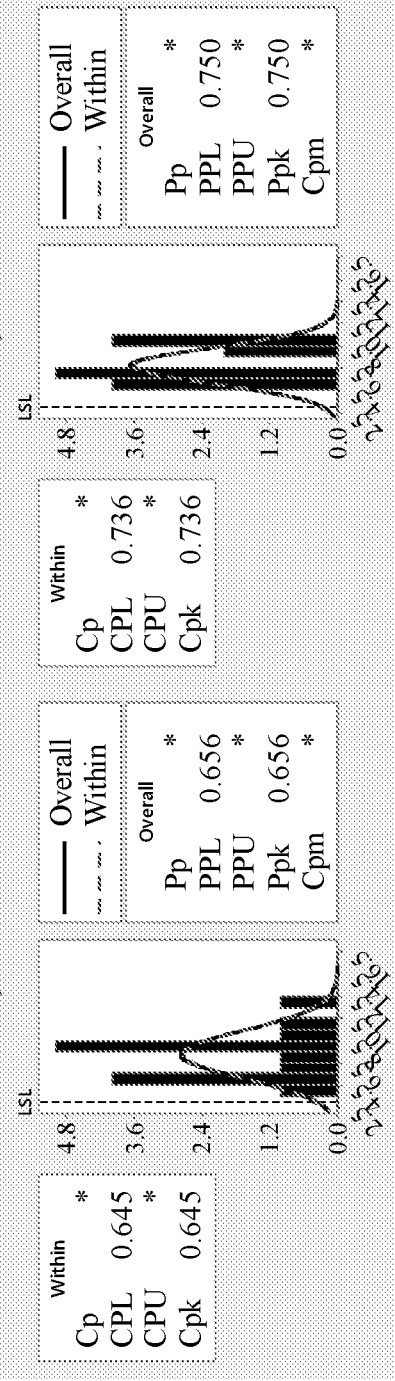

ALKALINE CELL WITH IMPROVED DISCHARGE EFFICIENCY

CROSS-REFERENCE TO RELATED APPLICATIONS

This application is a U.S. national phase application under 35 U.S.C. § 371 of International Application No. PCT/US2016/032202, filed on May 12, 2016, which claims priority to U.S. Provisional Patent Application No. 62/160,870, filed May 13, 2015, the entire disclosures of which are incorporated herein by reference in their entireties, for any and all purposes.

FIELD

The present technology is generally related to the field of zinc anodes for electrochemical cells. In particular, the technology is related to zinc anodes with improved reliability and discharge performance.

BACKGROUND

The anode discharge efficiency for an alkaline battery is dependent on the availability of sufficient anode reaction sites. This is can be achieved by increasing the surface area per unit weight of zinc by using more zinc fine particles or by lowering the apparent density of the zinc powder. However, the net increase in zinc surface area with the addition of zinc fine particles leads to high cell gassing and can result in reduced battery capacity and early leakage of the alkaline cells during high temperature storage conditions. New and improved ways to offset gassing-related problems without adversely affecting the battery performance are needed.

SUMMARY

In one aspect, a gelled anode for an alkaline battery is provided which includes zinc-based particles, an alkaline electrolyte, a gelling agent, and two or more additives selected from the group consisting of an alkali metal hydroxide, an organic phosphate ester surfactant, a metal oxide, and tin.

In another aspect, an alkaline electrochemical cell is provided which includes a positive current collector, a cathode in contact with the positive current collector, a gelled anode, a separator between the cathode and the anode, and a negative current collector in electrical contact with the anode. The gelled anode includes zinc-based particles, an alkaline electrolyte, a gelling agent, and two or more additives selected from the group consisting of an alkali metal hydroxide, an organic phosphate ester surfactant, a metal oxide, and tin.

In one aspect, the zinc-based particles of the anode include a zinc alloy. The zinc alloy includes 200 ppm each of bismuth and indium. The zinc alloy has a particle size distribution wherein from about 20% to about 50%, by weight relative to a total weight of zinc alloy has a particle size of less than about 75 micrometers.

In yet another aspect, a method for reducing the gassing of an electrochemical cell subject to gassing is provided, wherein the method includes providing as the active anode of said cell, a gelled anode comprising zinc-based particles, an alkaline electrolyte, a gelling agent, and two or more additives selected from the group consisting of an alkali metal hydroxide, an organic phosphate ester surfactant, a metal oxide, and tin.

BRIEF DESCRIPTION OF THE DRAWINGS

FIG. 23 illustrates the post-drop amp data of LR20 cells containing 32% KOH having lithium hydroxide with Rhodafac® RM-510, and 200Bi-200In STD or 200Bi-200In HF Zn alloy particles.

Figure 1:
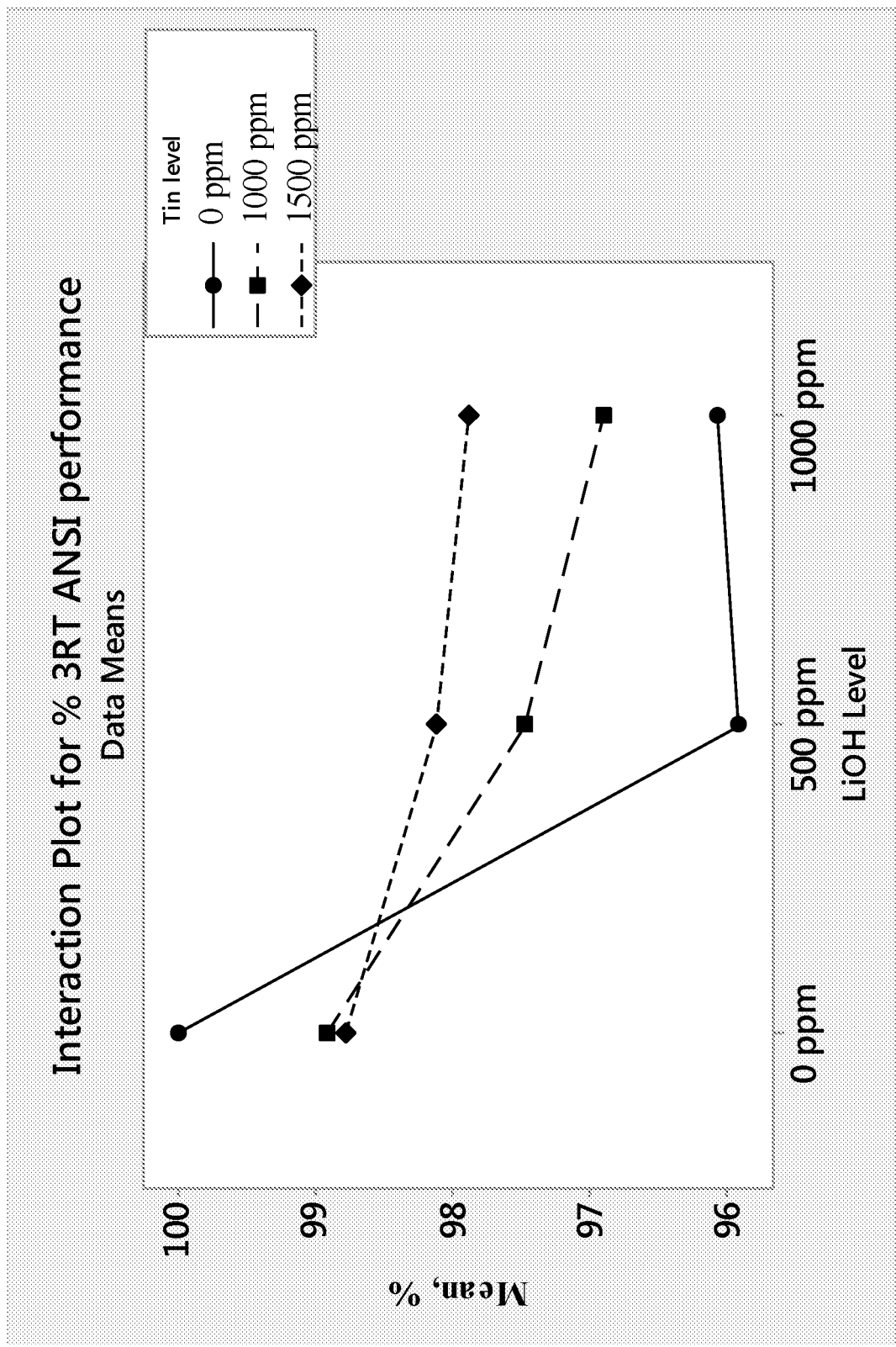
FIG. 1 illustrates an interaction plot for ANSI LR6 cell performance containing tin powder additive alone or in combination with lithium hydroxide.

It is to be further noted that the design or configuration of the components presented in these figures are not scale, and/or are intended for purposes of illustration only. Accordingly, the design or configuration of the components may be other than herein described without departing from the intended scope of the present disclosure. These figures should therefore not be viewed in a limiting sense.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Ratio, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, 5 to 40 mole % should be interpreted to include not only the explicitly recited limits of 5 to 40 mole %, but also to include sub-ranges, such as 10 mole % to 30 mole %, 7 mole % to 25 mole %, and so forth, as well as individual amounts, including fractional amounts, within the specified ranges, such as 15.5 mole %, 29.1 mole %, and 12.9 mole %, for example.

As used herein, the term "zinc anode" refers to an anode that includes zinc as an anode active material.

As used herein, "fines" are particles passing through a standard 200 mesh screen in a normal sieving operation (i.e., with the sieve shaken by hand). "Dust" consists of particles passing through a standard 325 mesh screen in a normal sieving operation. "Coarse" consists of particles not passing through a standard 100 mesh screen in a normal sieving operation. Mesh sizes and corresponding particle sizes as described here apply to a standard test method for sieve analysis of metal powders which is described in ASTM B214.

As used herein, "aspect ratio" refers to the dimension determined by the ratio between the length of the longest dimension of the particle and the relative width of the particle.

Alkaline batteries have been improved over the years to enhance their discharge capability as well as to improve their reliability. However, advances in the technology have been accompanied by enhanced cell gassing. Zinc anode gels of alkaline electrochemical cells are prone to electrochemical corrosion reactions when the battery cells are stored in the undischarged or partial discharged condition due to zinc anode corrosion. Effective additives which will decrease gassing, improve cell discharge, and control cell reliability are desired.

It has now been found that inclusion of certain additives in the gelled anode provides for improvements in the reliability and discharge performance of batteries containing the gelled anode. It is believed that this effect is provided by reducing the corrosion and gassing of the battery during storage. Further improvements in anode function can be accomplished by optimizing anode parameters such as zinc particle size distribution and potassium hydroxide (KOH) concentration in the anode gel. These anode enhancements were found to result in improved properties such as improved battery target, decreased cell gassing, and enhanced resistance to abuse testing.

In one aspect, a gelled anode for an alkaline electrochemical cell is provided, wherein the anode includes zinc-based particles, an alkaline electrolyte, a gelling agent, and additives. The additives may be selected from the group consisting of an alkali metal hydroxide, an organic phosphate ester surfactant, a metal oxide, and tin.

In one aspect, the alkaline electrochemical cell is a primary alkaline electrochemical cell. In another aspect, the alkaline electrochemical cell is a secondary alkaline electrochemical cell.

The gelled anode of the disclosed embodiments may be included as a component in a conventional electrochemical cell, such as a battery. These include, for example, alkaline cylindrical cells, e.g., zinc-metal oxide cell, as well as galvanic cells, such as in metal-air cells, e.g., zinc-air cell. For example, the anode may find application in alkaline cylindrical cells, button cells, and any metal air cells using flat, bent, or cylindrical electrodes. Among the cylindrical metal-metal oxide cells and metal-air cells, the anode material is applicable to those shaped for AA, AAA, AAAA, C, or D cells. Use of the anode material as components in other forms of electrochemical cells is also contemplated.

In one aspect, an alkaline electrochemical cell is provided which includes a positive current collector; a cathode in contact with the positive current collector; a negative current collector; an anode in contact with the negative current collector, wherein the anode includes zinc-based particles, an alkaline electrolyte, a gelling agent, and two or more additives. The additives may be selected from the group consisting of an alkali metal hydroxide, an organic phosphate ester surfactant, a metal oxide, and tin.

Suitable alkali metal hydroxides include, but are not limited to lithium hydroxide, sodium hydroxide, potassium hydroxide, calcium hydroxide, and cesium hydroxide. In some embodiments, the alkali metal hydroxide is lithium hydroxide.

Suitable organic phosphate ester surfactants may include alkyl and aryl phosphate esters with and without ethoxylation. Exemplary organic phosphate ester surfactants include ethylene oxide-adducts disclosed by Rossler et al. in U.S. Pat. No. 4,195,120, or surface-active heteropolar ethylene oxide additive including organic phosphate esters disclosed by Chalilpoyil et al. in U.S. Pat. No. 4,777,100, as well as commercially available surfactants such as organic phosphate esters such as e.g., poly(oxy-1,2-ethanediyl)-α-(dinonylphenyl)-ω-hydroxy-phosphate (e.g. available as Rhodafac® RM-510 from Solvay), polyoxyethylene tridecyl ether phosphate (e.g. available as Rhodafac® RS-610 from Solvay), poly(oxy-1,2-ethanediyl)-α-hydro-ω-hydroxy-$C_{8\text{-}10}$-alkyl ether phosphate (e.g. available as Rhodafac® RA-600 from Solvay), polyoxyethylene tridecyl ether phosphate or trideceth-6 phosphate (e.g. available as Crodafos® T6A from Croda), polyoxypropylene polyoxyethylene cetyl ether or PPG-5-Ceteth-10 Phosphate (e.g. available as Crodafos® SG-LQ or Crodafos® C10/5A from Croda), $C_{10}$-$C_{14}$ alcohol ethoxylate phosphate ester (e.g. available as Phospholan® PS-220 from Akzonobel), tridecyl alcohol ethoxylate phosphate ester (e.g. available as Phospholan® PS-131 from Akzonobel), nonylphenol ethoxylate phosphate ester (e.g. available as Phospholan® CS-141 from Akzonobel), sulfonated or sulfated organic acid type organic surfactant such as e.g., sodium salt of sulfated oleic acid (e.g. available as Witconate® 1840X from AkzoNobel), or amphoteric surfactants such as e.g., amine carboxylates (e.g. available as Mafo® 13 MOD1 from BASF Corporation) or a combination of any two or more thereof. In some embodiments, the organic phosphate ester surfactant includes poly(oxy-1,2-ethanediyl)-α-(dinonylphenyl)-ω-hydroxy-phosphate. In some embodiments, the organic phosphate ester surfactant includes Rhodafac® RM-510.

Suitable metal oxides include, but are not limited to, cerium oxide, aluminum oxide, calcium oxide, bismuth oxide, boron oxide, zirconium oxide, tin oxide, iron oxide, magnesium oxide, chromium oxide, gallium oxide, silicon oxide, lithium oxide, lithium aluminum oxide, molybdenum oxide, strontium oxide, barium oxide, titanium oxide and lanthanum oxide or a combination of two or more thereof. In some embodiments, the metal oxide includes cerium oxide.

In some embodiments, the gelled anode includes two or more additives selected from an alkali metal hydroxide, an organic phosphate ester surfactant, a metal oxide, and tin. In some embodiments, the gelled anode includes two or more additives selected from an organic phosphate ester surfactant, a metal oxide, and tin. In some embodiments, the gelled anode includes two or more additives selected from an alkali metal hydroxide, a metal oxide, and tin. In some embodiments, the gelled anode includes two or more additives selected from an alkali metal hydroxide, an organic phosphate ester surfactant, and a metal oxide. In some embodiments, the gelled anode includes two or more additives selected from an alkali metal hydroxide, an organic phosphate ester surfactant, and tin. In some embodiments, the additive includes lithium hydroxide and a phosphate ester surfactant.

When used, the amount of additives present in the gelled anode may be determined or selected to optimize performance of the gelled anode. For example, each additive may range from about 0.0001% to about 10% by weight of the anode. This includes from about 0.005% to about 5% by weight, about 0.001% to about 1% by weight, about 0.005% to about 0.1% by weight, or about 0.01% to about 0.5% by weight, by weight of relative to the weight of the anode, and ranges between any two of these values or less than any one of these values. In some embodiments, the total amount of additive may range from about 0.001% to about 0.04% by weight of the anode. The total amount of additives may range from about 0.0001% to about 20% by weight of the anode.

The concentration of the alkali metal hydroxide additive may range from about 0.0001 wt % to about 10 wt % relative to the weight of the anode. This includes from about 0.005 wt % to about 5 wt %, about 0.001 wt % to about 1 wt %, about 0.005 wt % to about 0.15 wt %, about 0.02 wt % to about 0.2 wt %, or about 0.01 wt % to about 0.1 wt % relative to the weight of the anode, and ranges between any two of these values or less than any one of these values. In some embodiments, the alkali metal hydroxide is lithium hydroxide and it is present at a concentration from about 0.02 wt % to about 0.2 wt % relative to the total weight of the gelled anode mixture.

The concentration of metal oxide additive may range from about 0.0001 wt % to about 10 wt % relative to the weight of the anode. This includes from about 0.005 wt % to about 5 wt %, about 0.001 wt % to about 1 wt %, about 0.005 wt % to about 0.15 wt %, about 0.05 wt % to about 0.2 wt %, or about 0.01 wt % to about 0.1 wt % relative to the weight of the anode, and ranges between any two of these values or less than any one of these values. In some embodiments, the metal oxide is cerium oxide and it is present at a concentration from about 0.05 wt % to about 0.2 wt % relative to the total weight of the gelled anode mixture.

The concentration of organic phosphate ester surfactant additive may range from about 0.0001 wt % to about 10 wt % relative to the weight of the anode. This includes from about 0.005 wt % to about 5 wt %, about 0.004 wt % to about 1 wt %, about 0.003 wt % to about 0.01 wt %, about 0.002 wt % to about 0.005 wt %, about 0.001 wt % to about 0.015 wt %, about 0.001 wt % to about 0.008 wt %, or about 0.01 wt % to about 0.1 wt % relative to the weight of the anode, and ranges between any two of these values or less than any one of these values. In some embodiments, the organic phosphate ester surfactant is present at a concentration from about 0.001 wt % to about 0.015 wt % relative to the total weight of the gelled anode mixture.

The concentration of metal additive may range from about 0.0001 wt % to about 10 wt % relative to the weight of the anode. This includes from about 0.005 wt % to about 5 wt %, about 0.001 wt % to about 1 wt %, about 0.005 wt % to about 0.15 wt %, about 0.05 wt % to about 0.2 wt %, or about 0.01 wt % to about 0.1 wt % relative to the weight of the anode, and ranges between any two of these values or less than any one of these values. In some embodiments, the metal is tin and it is present at a concentration from about 0.05 wt % to about 0.2 wt % relative to the total weight of the gelled anode mixture.

The zinc-based particles may be zinc alloy particles. Zinc alloy particles may include alloying elements intended to raise the over-potential for hydrogen evolution to minimize the formation of hydrogen at cathode sites. In some embodiments, the zinc may be alloyed with one or more metals selected from indium, bismuth, calcium, aluminum, lead, and phosphorous. In some embodiments, the alloying metal is bismuth. In some embodiments, the zinc alloy includes zinc, bismuth, and indium. In some embodiments, the zinc alloy includes zinc, bismuth, indium, and aluminum. The concentrations of the metals alloyed with zinc may range from about 20 ppm to about 750 ppm. In some embodiments, the alloying metals are present at a concentration of about 50 ppm to 550 ppm. In other embodiments, the alloying metals are present at a concentration of about 150 ppm to 250 ppm. Typically, alloy materials may include from about 0.01% to about 0.5% by weight of alloy agent alone, or in combination with, from about 0.005% to about 0.2% by weight of a second alloying agent such as lithium, calcium, aluminum, and the like. In some embodiments, the zinc alloy includes bismuth and indium as main alloying elements. In some embodiments, the zinc alloy includes bismuth and indium as main alloying elements, each at a concentration of about 200 ppm.

The zinc-based particles can be present in the anode in the form of coarse, fines, or dust, for example, or combinations of these forms. The zinc-based particles may have an average particle size of about 70 micrometers to about 175 micrometers. This includes an average particle size of about 75 micrometers, about 80 micrometers, about 85 micrometers, about 90 micrometers, about 100 micrometers, about 110 micrometers, about 120 micrometers, about 130 micrometers, about 140 micrometers, or about 150 micrometers. In some embodiments, the zinc alloy particles have an average particle size of about 100 micrometers to about 170 micrometers. In some embodiments, the zinc-based particles are zinc alloy particles having an average particle size of about 120 micrometers.

Conventionally, suppression of gassing in the electrochemical cells is achieved by adjusting the particle size distribution of zinc-based particles, that is by optimizing the concentration of coarse particles (>150 μm), dust particles (<45 μm), and fines particles (<75 μm). Standard zinc-based particles (STD) which are conventionally used in electrochemical cells have a particle size distribution of about 0.5% to about 2.0% dust, about 5% to about 25% fines and about 25% to about 60% coarse particles. The inclusion of additives described herein allows for an increase in the content of fine zinc anode particles, that is particles passing 200 mesh screen size (75 μm), without concurrent increase in cell gassing. Accordingly, in some embodiments, the negative electrode includes high fines (HF) zinc-based particles whose fines content is higher and coarse content is lower than that of conventional standard zinc powders. In some embodiments, greater than 15% by weight, relative to the total weight of zinc-based particles in the electrode, have a particle size of less than about 75 micrometers. This includes embodiments wherein greater than about 20%, greater than about 25%, greater than about 30% or greater than about 35% by weight, relative to the total weight of the zinc-based particles in the electrode, have a particle size of less than about 75 micrometers. In some embodiments, about 15% to about 60% by weight, relative to the total weight of the zinc-based particles in the electrode, have a particle size of less than about 75 micrometers. This includes embodiments wherein about 15% to about 55%, about 20% to about 50%, about 25% to about 45%, or about 35% to about 40%, and ranges between any two of these values or less than any of these values, by weight, relative to the total weight of the zinc-based particles in the electrode, have a particle size of less than about 75 micrometers. In some embodiments, about 30% by weight, relative to the total weight of the zinc-based particles in the electrode, have a particle size of less than about 75 micrometers. In some embodiments, about 35% by weight, relative to the total weight of the zinc-based particles in the electrode, have a particle size of less than about 75 micrometers. In some embodiments, about 40% by weight, relative to the total weight of the zinc-based particles in the electrode, have a particle size of less than about 75 micrometers. In some embodiments, the zinc-based particles include zinc alloy having 200 ppm each of bismuth and indium. In some embodiments, about 20% to about 50%, by weight relative to a total weight of zinc alloy has a particle size of less than about 75 micrometers.

In some embodiments, the negative electrode includes zinc-based particles wherein about 2% to about 10% by weight of the zinc-based particles, relative to the total zinc in the electrode, have a particle size of less than about 45 micrometers. In some embodiments, the negative electrode includes zinc-based particles wherein about 8% to about 20% by weight of the zinc-based particles, relative to the total zinc in the electrode, have a particle size of greater than about 150 micrometers. As noted above, the amount ranges for dust in standard zinc is 0.5% to 2% and the amount range for coarse particles in standard zinc is 25% to 60%. In some embodiments, the zinc-based particles include zinc alloy having 200 ppm each of bismuth and indium. In some embodiments, about 20% to about 40% by weight, relative to the total amount of zinc alloy has a particle size of less than about 75 microns, and about 8% to about 20% by weight relative of the total zinc alloy has a particle size of greater than about 150 micrometers.

A suitable zinc particle size distribution may be one in which at least 70% of the particles have a standard mesh-sieved particle size within a 100 micron size range and in which the mode of the distribution is between about 100 and about 300 microns. In one embodiment, a suitable zinc particle size distribution include particle size distributions meeting the above-noted tests and having a mode of 100 microns, 150 microns, or 200 microns, each plus or minus about 10%. In one embodiment, about 70% of the particles are distributed in a size distribution range narrower than about 100 microns, for example about 50 microns, or about 40 microns, or less.

The technology provides a gelled anode having yield stress of greater than about 500 N/m$^2$. This includes yield stress of from about 500 N/m$^2$ to about 4000 N/m$^2$, from about 600 N/m$^2$ to about 3500 N/m$^2$, from about 1000 N/m$^2$ to about 2500 N/m$^2$, or of about 1500 N/m$^2$ to about 2000 N/m$^2$, and ranges between any two of these values or less than any one of these values. In some embodiments, the gelled anode has a yield stress value of about 600 N/m$^2$ to about 3500 N/m$^2$.

The gelled anode materials have a suitable viscosity required to provide the enhanced cell discharge performance. For example, the viscosity may be from about 10,000 cps to about 200,000 cps, from about 25,000 cps to about 150,000 cps, or from about 50,000 cps to about 100,000 cps, and ranges between any two of these values or less than any one of these values, at about 25° C. In some embodiments, the gelled anode material has a viscosity of about 25,000 to 150,000 cps at 25° C.

The gelled anode of the disclosed embodiments may be included as a component in a conventional electrochemical cell such as batteries. These include, for example, alkaline cylindrical cells, e.g., zinc-metal oxide cell, as well as galvanic cells, such as in metal-air cells, e.g., zinc-air cell. Among the cylindrical metal-metal oxide cells and metal-air cells, the anode material is applicable to those shaped for AA, AAA, AAAA, C, or D cells. Metal-air cells which include the anode described herein may usefully be constructed as button cells for the various applications such as hearing aid batteries, and in watches, clocks, timers, calculators, laser pointers, toys, and other novelties. Also, the anode may find application in any metal air cell using flat, bent, or cylindrical electrodes. Use of the anode material as components in other forms of electrochemical cells is also contemplated.

Accordingly, in one aspect, provided is an alkaline electrochemical cell which includes a positive current collector, a cathode in contact with the positive current collector, a gelled anode, a separator between the cathode and the anode, and a negative current collector in electrical contact with the anode. In some embodiments of the electrochemical cell, the gelled anode includes zinc-based particles, alkaline electrolyte, a gelling agent, and two or more additives selected from the group consisting of an alkali metal hydroxide, an organic phosphate ester surfactant, a metal oxide and tin. In some embodiments, the alkali metal hydroxide is lithium hydroxide. In some embodiments, the phosphate ester surfactant is Rhodafac® RM-510 or Crodafos® SG-LQ. In some embodiments, the metal oxide is cerium oxide. In some embodiments, the additive includes lithium hydroxide and cerium oxide. In some embodiments, the additive includes lithium hydroxide and tin. In some embodiments, the additive includes lithium hydroxide, cerium oxide, and tin.

Figure 17:
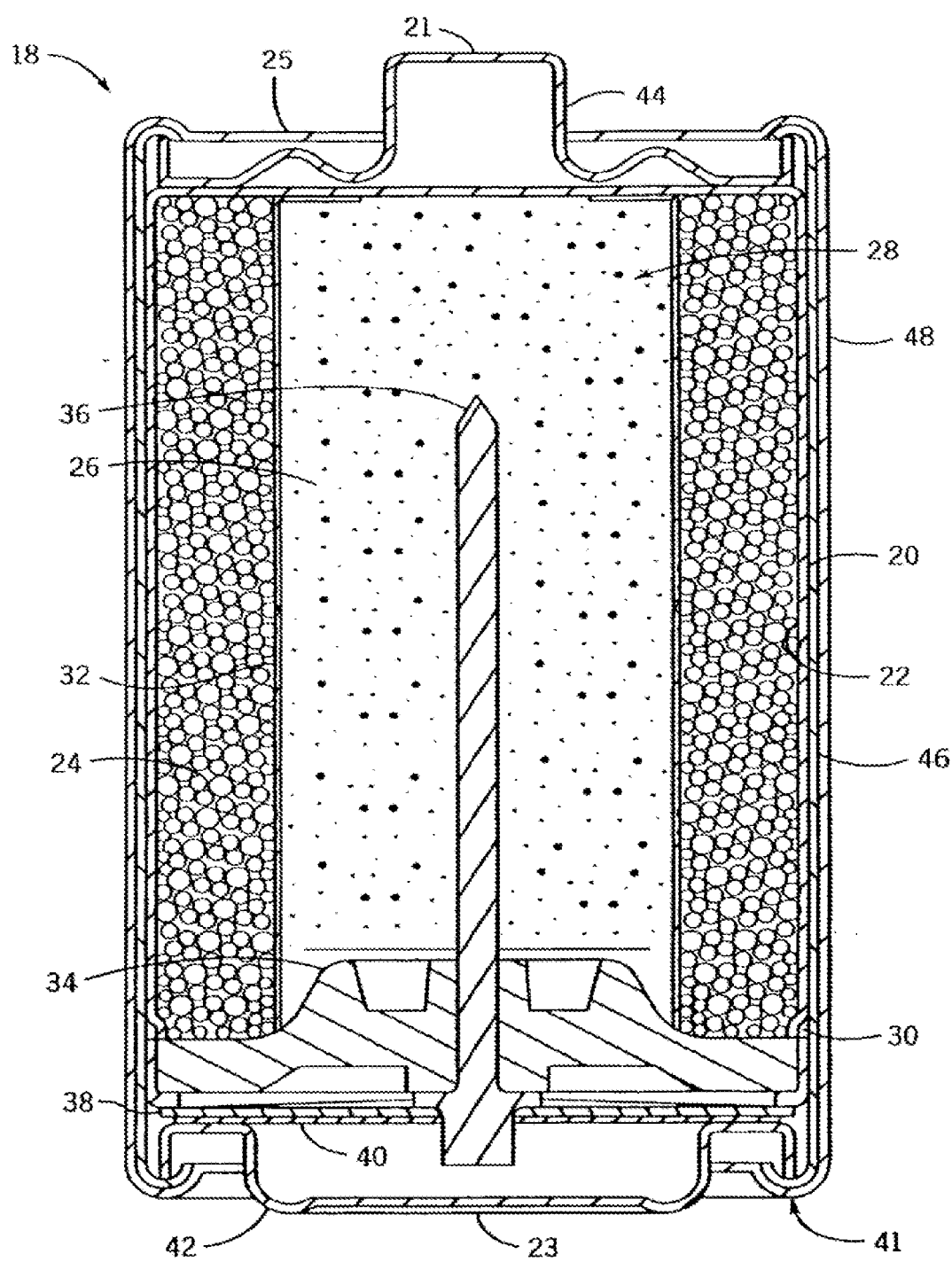
FIG. 17 is a cross-sectional schematic view depicting an illustrative electrochemical cell of an embodiment of the present disclosure.

An exemplary embodiment of an alkaline electrochemical cell is illustrated in FIG. 17, although other designs should not be so limited. Referring initially to FIG. 17, an axially extending cylindrical cell 18 has a positive terminal 21, a negative terminal 23, and a positive current collector in the form of a cylindrical steel container 20. Container 20 is initially closed at its positive end 25 proximal the positive terminal 21 and open at its end proximal the negative terminal 23 such that the negative end of container is crimped to close the cell 18 as is understood generally by a skilled artisan.

At least one or more cylindrical annular cathode rings 24, formed such that their outside diameters at their outer peripheral sidewalls are slightly greater than the inside diameter of the positive current collector 20, are forced into the positive current collector. A coating 22, desirably carbon, can be applied to the radially inner surface of container 20 to enhance the electrical contact between the cathode rings 24 and the container. Also, a nickel plating material in between the can and the carbon coating can be present to protect the can surface from corroding. Installation of the cathode rings 24 forms a pressure contact with coating 22. Cathode 24 further presents an inner surface 27 that define a centrally shaped void 28 in a cylindrical cell within which anode 26 is disposed.

A separator 32 is disposed between the anode 26 and cathode 24. Anode 26, which is placed inside of the cathode rings 24, is generally cylindrically shaped, and has an outer peripheral surface which engages the inner surfaces of a separator 32, and comprises gelled zinc in accordance with at least one aspect of the present invention. The separator is disposed adjacent to the inner wall 27 between the cathode 24 and anode 26. An alkaline aqueous electrolyte may include a potassium hydroxide and water at least partially wets anode 26, cathode rings 24, and separator 32.

A bead 30 is rolled into the container near the negative end 41 to support a sealing disk 34. The sealing disk 34, having a negative current collector 36 extending therethrough, is placed into the open end of the container 20 and in contact with the bead 30. The negative open end 41 of the container 20 is crimped over the sealing disk 34 thus compressing it between the crimp and the bead 30 to close and seal the cell. An insulation washer 38 with a central aperture is placed over the crimped end of the cell such that the end of the negative current collector 36 protrudes through the aperture. A contact spring 40 is affixed to the end of the negative current collector 36. Negative terminal cap 42 and positive terminal cap 44 are placed into contact with the contact spring 40 and the positive current collector 20, respectively, and an insulating tube 46 and steel shell 48 can be placed around the cell 18 and crimped on their ends to hold the terminal caps in place. It should be appreciated that steel shell 48 and insulating tube 46 could be eliminated to increase the internal volume for the cell that may be occupied by active ingredients. Such an arrangement is described in U.S. Pat. No. 5,814,419.

The alkaline electrolyte may include an aqueous solution of an alkali metal hydroxide such as for example sodium hydroxide, potassium hydroxide, and can also include other electrolytes known to those of ordinary skill in the art. In addition to sodium and potassium hydroxides, other materials such as lithium hydroxide, cesium hydroxide, beryllium hydroxide, magnesium hydroxide, calcium hydroxide, strontium hydroxide and barium hydroxide may be used to form the electrolyte. In one embodiment, the alkaline electrolyte includes potassium hydroxide (KOH). The electrolyte concentration may be at less than 60%, for example, less than 50%, less than 45%, less than 40%, less than 35%, or less than 30%. In some embodiments, the electrolyte may include KOH at a concentration of less than about 40%. In some embodiments, the electrolyte may include KOH at a concentration of less than about 32%. In some embodiments, the electrolyte may include KOH at a concentration of less than about 30%. In some embodiments, the electrolyte may include KOH at a concentration of about 25% to about 32%. In some embodiments, the electrolyte may include KOH at a concentration of about 28% to about 31%. In some embodiments, the electrolyte may include KOH at a concentration of about 32%. In some embodiments, the electrolyte may include KOH at a concentration of about 30.5%.

The cathode of the electrochemical cell may include any cathode active material generally recognized in the art for use in alkaline electrochemical cells. The cathode active material may be amorphous or crystalline, or a mixture of amorphous and crystalline. For example, the cathode active material may include, or be selected from, an oxide of copper, an oxide of manganese as electrolytic, chemical, or natural type (e.g., EMD, CMD, NMD, or a mixture of any two or more thereof), an oxide of silver, and/or an oxide or hydroxide of nickel, as well as a mixture of two or more of these oxides or hydroxide. Suitable examples of positive electrode materials include, but are not limited to, $MnO_2$ (EMD, CMD, NMD, and mixtures thereof), NiO, NiOOH, $Cu(OH)_2$, cobalt oxide, $PbO_2$, AgO, $Ag_2O$, $Ag_2Cu_2O_3$, $CuAgO_2$, $CuMnO_2$, Cu $Mn_2O_4$, $Cu_2MnO_4$, $Cu_{3-x}Mn_xO_3$, $Cu_{1-x}Mn_xO_2$, $Cu_{2-x}Mn_xO_2$ (where x<2), $Cu_{3-x}Mn_xO_4$ (where x<3), $Cu_2Ag_2O_4$, or a combination of any two or more thereof.

The electrochemical cell may include a separator between the cathode and the zinc anode, which is designed for preventing short-circuiting between the two electrodes. Generally, any separator material and/or configuration suitable for use in an alkaline electrochemical cell, and with the cathode and/or anode materials set forth herein above, may be used in accordance with the present disclosure. In one embodiment, the electrochemical cell includes a sealed separator system that is disposed between a gelled anode of the type described here and a cathode. The separator may be made of any alkaline resistant material, including, but not limited to, polyvinyl alcohol, Tencel® (lyocell), mercerized wood pulp, polypropylene, polyethylene, cellophane, and combinations thereof. In some embodiments, the separator includes polypropylene.

In another embodiment, the electrochemical may be prepared by any means known in the art, so long as the resulting cell does not conflict with the disclosures presented herein. Thus, the present disclosure includes a method of preparing a electrochemical cell including the components and their respective concentrations as discussed throughout the entirety of this disclosure.

Including two or more additives selected from the group consisting of an alkali metal hydroxide, an organic phosphate ester surfactant, a metal oxide, and tin as described herein, results in several advantages such as for example, maintaining or suppressing cell reliability and cell gassing while simultaneously enhancing high rate discharge performance capabilities, reduction of drop test failures, improvement in battery amperage, close circuit voltage, and decrease in cell impedance.

In one aspect, a method for reducing the gassing of an electrochemical cell subject to gassing is provided, wherein the method includes providing as the active anode of said cell, a gelled anode including zinc-based particles, wherein less than 20% of the zinc-based particles, by weight relative to the total zinc in the electrode, have a particle size of greater than about 150 micrometers. In some embodiments, the method includes a zinc anode providing as the active anode of said cell, a gelled anode including zinc-based particles, wherein about 10% to about 20% of the zinc-based particles, by weight relative to the total zinc in the electrode, have a particle size of greater than about 150 micrometers. In some embodiments, the method includes providing as the active anode of said cell, a gelled anode including zinc-based particles, wherein about 4% to about 9% of the zinc-based particles, by weight relative to the total zinc in the electrode, have a particle size of greater than about 150 micrometers. In some embodiments, the gassing is reduced from about 10% to about 50%. This includes a reduction in gassing of from about 10% to about 45%, from about 15% to about 40%, from about 20% to about 40%, or from about 30% to about 40%, and ranges between any two of these values or less than any one of these values. In some embodiments, the gassing is reduced from about 10% to about 60% in battery cells having two or more additives selected from the group consisting of an alkali metal hydroxide, an organic phosphate ester surfactant, a metal oxide, and tin.

The present technology, thus generally described, will be understood more readily by reference to the following examples, which are provided by way of illustration and are not intended to be limiting of the present technology.

EXAMPLES

In the Examples presented below, electrochemical cells were tested for DSC performance, partial discharge cell gassing, undischarged cell gassing, and conditions after storage. Gelled anodes were prepared in accordance with the improvements of the present disclosure.

Gel viscosity is measured using Brookfield digital viscometer and teflon-coated spindle #06 at 4 rpm. When measuring, allow the reading to stabilize over 5 minutes before recording the viscosity value.

For yield stress value measurement, measuring the gel viscosity values at 1.0 rpm (R1) and 0.5 rpm (R2) respectively, the yield stress value is calculated using the formula: yield stress value=(R2−R1)/100.

Electrochemical cells may be tested in accordance with methods under the American National Standards Institute (ANSI). For example, the ANSI data plotted in FIGS. 1, and 5 correspond to testing done according to ANSI C18.1M, Part 1-2009 and the ANSI data plotted in FIGS. 11 and 18 correspond to testing done according to ANSI C18.1M Part 1-2015. These tests include determining cell performance/longevity under various discharge modes including cell pulse discharge, intermittent cell discharge, or Digital Still Camera, DSC (i.e., repeated application of 1500 mW for a period of 2 seconds and 650 mW for a period of 28 seconds during a period of 5 minutes every hour until the cell voltage reaches the end point voltage of 1.05 V), among other tests. Tests also include determining cell performance/longevity by discharging them in various devices such as Toys, Boom Box and Heavy Industrial Flashlight (HIF). The ANSI C18.1M, Part 1-2009 testing as applied to AA cells, include nine ANSI tests which are carried out by measuring the average discharge performance from each test on at least 4 cells having a defined anode formula relative to the performance of cells having a known (control) anode formula. The ANSI mean is then normalized to the value of the control cell with known anode formula stated at 100% as a relative value. Thus, the cell discharge performance, such as DSC performance, etc. is plotted against the varying amounts of the additives such as LiOH and tin. For C18.1M Part 1-2015, the AA ANSI test is made up of seven tests. Exemplary test conditions are listed in the Tables below and results of various tests of cells of the present disclosure are detailed below.

TABLE 1

C18.1M, Part 1-2009 ANSI Test conditions

| Tests Load and Duty Cycle | Endpoint Voltage | Application |
|---|---|---|
| AA Size (C18.M, Part 1-2009) Individual Tests Used to Calculate the Ratings | | |
| 1500 mW/2 sec/650 mW/ 28 sec//5 min/hr | 1.05 V | Digital Camera |
| 1000 mA 10 s/m 1 hr/day | 0.9 | Photo Pulse |
| 3.3 Ohm 4 m/hr 8 hr/day | 0.9 | Flashlight |
| 500 mA 2 m/15 m | 0.8 | Toothbrush |
| 3.9 Ohms 1 hr/day | 0.8 | Toy |
| 250 mA 1 hr/day | 0.9 | CD, MD Player, games |
| 100 mA 1 hr/day | 0.9 | Tape |
| 24 Ohms 15 s/m 8 hr/day | 1.0 | Remote |
| 43 Ohms 4 hr/day | 0.9 | Radio |
| AAA Size (C18.1M, Part 1-2009) | | |
| 600 mA 10S/M 1 hr/day | 0.9 | Photo Pulse |
| 5.1 Ohm 4 m/hr 8 hr/day | 0.9 | Lighting |
| 5.1 Ohm 1 hr/day | 0.8 | Toy |
| 100 mA 1 hr/day | 0.9 | Cassette recorder |
| 24 Ohms 15 s/m 8 hr/day | 1.0 | Remote |
| D Size (C18.1M, Part 1-2009) | | |
| 1.5 Ohm HIFT (4 m/15 hr 8 h/day) | 0.9 | Lighting |
| 2.2 Ohm LIFT (4 m/hr 8 h/day) | 0.9 | Lighting |
| 2.2 Ohm 1 hr/day | 0.8 | Toy |
| 600 mA 2 hr/day | 0.9 | Portable Stereo |
| 10 Ohm 4 hr/day | 0.9 | Radio |
| C Size (C18.1M, Part 1-2009) | | |
| 3.9 Ohm LIFT (4 m/hr 8 hr/day) | 0.9 | Lighting |
| 3.9 Ohm 1 hr/day | 0.8 | Toy |
| 400 mA 2 hr/day | 0.9 | Portable Stereo |
| 20 Ohm 4hr/day | 0.9 | Radio |
| 9-Volt Size (C18.1M, Part 1-2009) | | |
| 270 Ohm 1 hr/day | 5.4 | Toy |
| 620 Ohm 2 hr/day | 5.4 | Radio |
| 620 Ohm 1 s/hr, 10 K ohm background load | 7.5 | Smoke Alarm |

TABLE 2

C18.1M, Part 1-2015 ANSI Test conditions for AA cells

| | C18.1M, Part 1-2015 | | | |
|---|---|---|---|---|
| Designation | ANSI IEC Common* | 15A, 15AC LR6 AA | 15D R6P AA | 15N ZR6 AA |
| Electrochemical System | | Alkaline manganese dioxide | Carbon zinc | Nickel oxyhydroxide |
| Nominal Voltage | | 1.5 | 1.5 | 1.5 |
| Maximum Off-load Voltage | | 1.68 | 1.73 | 1.78 |
| Performance after 12 Months | | 90% | 80% | 90% |

| Application | Load 1 | Load 2 | Load Units | Duty Cycle Load Period‡ | Daily Cycle | End Point Voltage | Minimum Average Duration | | |
|---|---|---|---|---|---|---|---|---|---|
| Digital Camera | 1,500 | 650 | mW | Load 1 for 2 s, then Load 2 for 28 s | 5 min on, 55 min off each hour | 1.05 | 50 Pulses** | No Test | 120 Pulses** |
| Personal Grooming | 750 | — | mA | 2 min/h | 8 h/day | 1.1 | 25 min | No Test | 24 min |
| CD/Electronic Games/Non-Motor Toy | 250 | — | mA | — | 1 h on, then 23 h off | 0.9 | 6 h | 1 h | 6 h |
| Digital Audio | 100 | — | mA | — | 1 h on, then 23 h off | 0.9 | 16 h | 4.5 h | No Test |
| Remote/Radio/Clock | 50 | — | mA | 1 h on, then 7 h off | 24 h | 1.0 | 32 h | 13 h | 27 h |
| Portable lighting | 3.9 | — | Ohms | 4 min on, then 56 min off | 8 h on, then 16 h off | 0.9 | 3 h | 1 h | No Test |
| Toy | 3.9 | — | Ohms | — | 1 h on, then 23 h off | 0.8 | 5 h | 1.2 h | No Test |

*The common designation can be preceded or followed by letters or numbers.
‡If blank, the daily cycle designates the complete load period.
**Where pulses are indicated as the minimum average duration unit, 1 pulse = 1 complete load period.

TABLE 3

C18.1M, Part 1-2015 ANSI Test conditions for D cells

| | C18.1M, Part 1-2015 | | |
|---|---|---|---|
| Designation | ANSI IEC Common* | 13A, 13AC LR20 D | 13D R20P D |
| Electrochemical System | | Alkaline manganese dioxide | Carbon zinc |
| Nominal Voltage | | 1.5 | 1.5 |
| Maximum Off-load Voltage | | 1.68 | 1.73 |
| Performance after 12 Months | | 90% | 80% |

| Application | Load 1 | Load 2 | Load Units | Duty Cycle Load Period‡ | Daily Cycle | End Point Voltage | Minimum Average Duration | |
|---|---|---|---|---|---|---|---|---|
| Portable Stereo | 600 | — | mA | — | 2 h on, then 22 h off | 0.9 | 11 h | 2.5 h |
| Portable lighting (1) | 1.5 | — | Ohms | 4 min on, then 11 min off | 8 h on, then 16 h off | 0.9 | 9 h | No test |
| Portable lighting (2) | 2.2 | — | Ohms | 4 min on, then 56 min off | 8 h on, then 16 h off | 0.9 | 15.8 h | 5.3 h |
| Toy | 2.2 | — | Ohms | — | 1 h on, then 23 h off | 0.8 | 17.5 h | 5.5 h |

TABLE 3-continued

C18.1M, Part 1-2015 ANSI Test conditions for D cells

| Radio | 10 | — | Ohms | — | 4 h on, then 20 h off | 0.9 | 90 h | 33 h |

*The common designation can be preceded or followed by letters or numbers.
‡If blank, the daily cycle designates the complete load period.

Figure 2:
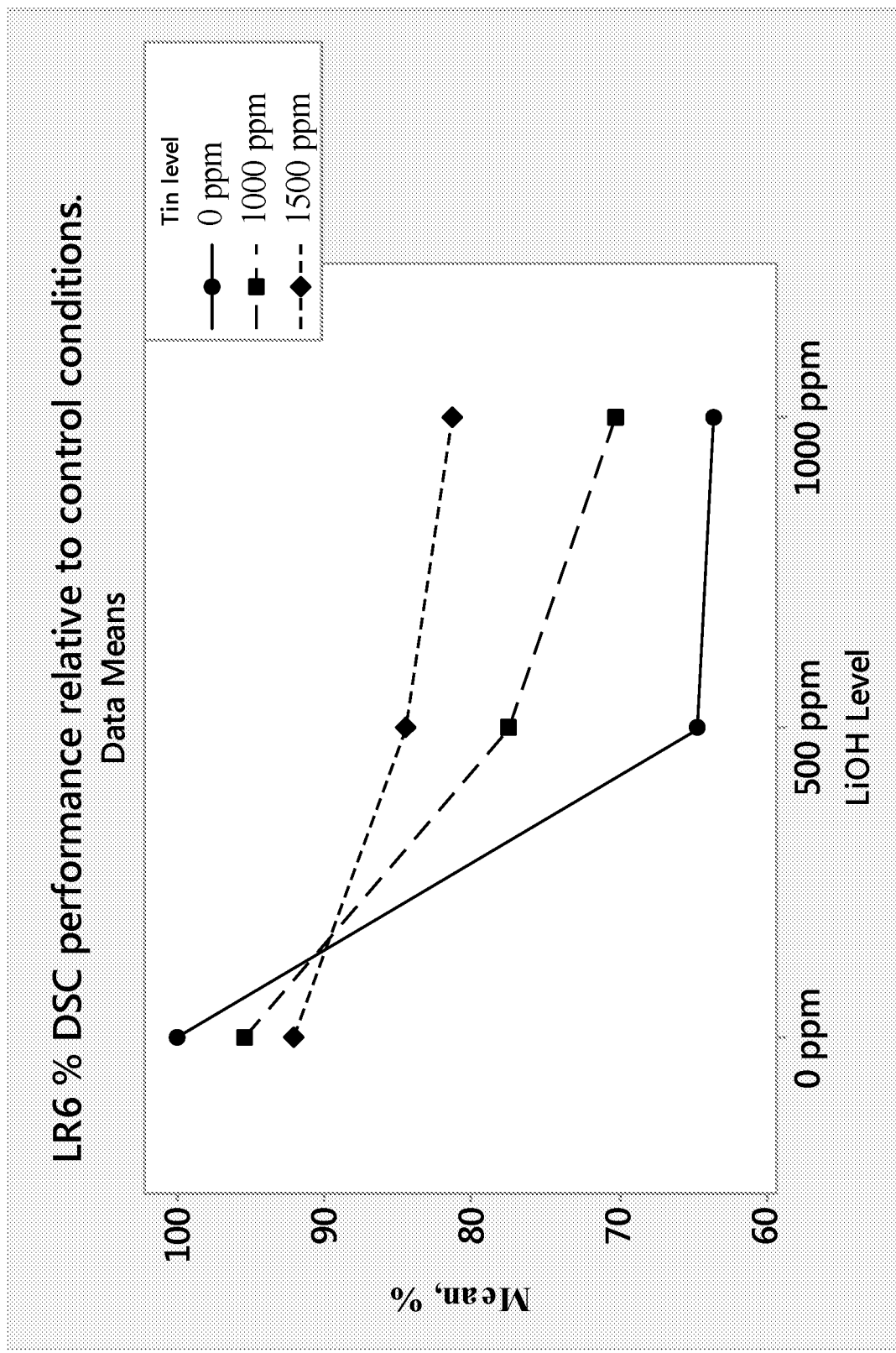
FIG. 2 is a graph illustrating DSC performance of a LR6 cell as described in FIG. 1.

The anode gels of the LR6 cells described in FIG. 1 had a gel KOH concentration at 28% and the corresponding zinc loading was at 67.5%, relative to the weight of the gel. The zinc powder had bismuth and indium as main alloying elements at a concentration of about 200 ppm and 200 ppm, respectively. Lithium hydroxide (LiOH) was tested at a concentration of about 500 ppm and 1000 ppm, added as LiOH.H$_2$O, to determine its impact on performance and reliability. Along with lithium hydroxide, tin powder was added as a second additive at 0 ppm, 1000 ppm, and 1500 ppm concentration. The addition of lithium hydroxide is intended to suppress cell gassing and the addition of tin to counteract the performance effect of lithium hydroxide. As seen from FIG. 1, in the presence of LiOH, the ANSI performance of cells having tin powder additive content at 1000 ppm and 1500 ppm increased relative to the cells having 0 ppm tin powder additive. FIG. 1 shows that without tin the ANSI performance is suppressed in the presence of LiOH whereas the performance in the presence of LiOH increases with increasing additions of tin. The trends in DSC performance due to the presence of LiOH and tin are shown in FIG. 2, resembling the trends observed in the ANSI performance described in FIG. 1. The data in FIG. 1 indicates that increasing levels of tin in combination with lithium hydroxide tends to provide improved ANSI performance relative to that of cells not having tin as additive.

Figure 3:
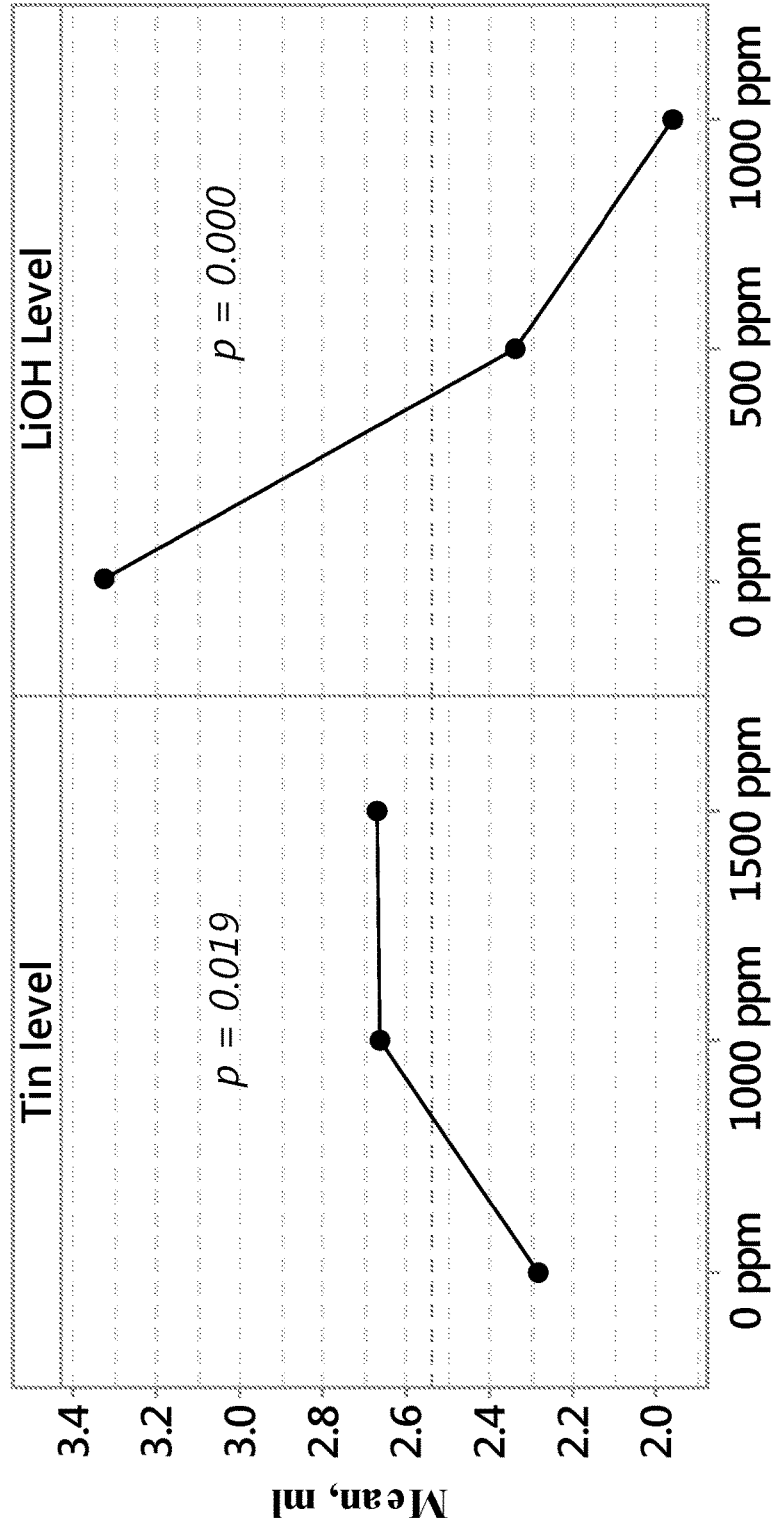
FIG. 3 is a graph illustrating gassing characteristics of partially discharged (PD) cells having tin powder additive alone or in combination with lithium hydroxide.
Figure 4:
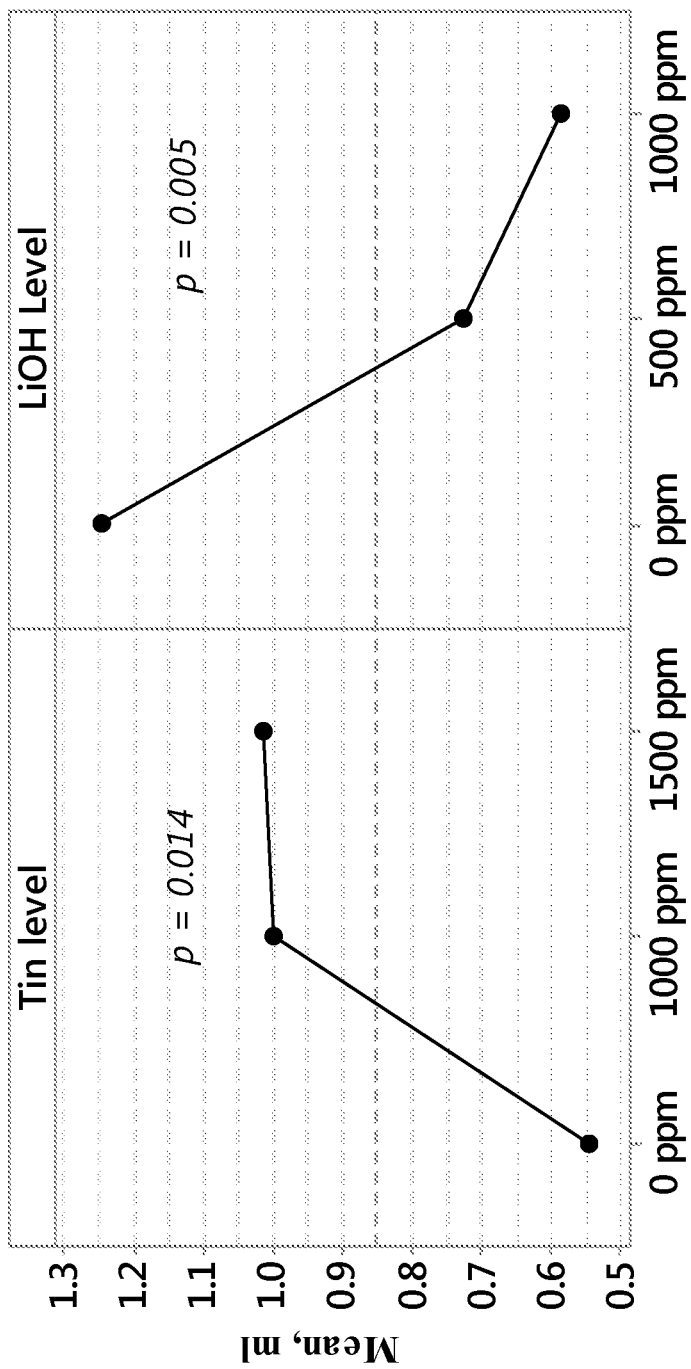
FIG. 4 is a graph illustrating gassing characteristics of undischarged (UD) cells having tin powder additive alone or in combination lithium hydroxide.

The cell gassing results corresponding to the cell whose performance is described above are shown in FIG. 3 and FIG. 4. FIG. 3 shows cell gassing data from the LR6 (AA) alkaline cell described above after partial discharge and storage at 71.1° C. for one week in a dry oven. Partial discharge for this cell size was carried out at a constant current of 250 mA for 1.80 hours. The corresponding undischarged cell gassing results are displayed in FIG. 4. In this case, cell gassing is preceded by storage of the undischarged cell at 71.1° C. for one week in a dry oven. Both partially discharged and undischarged cell gassing is suppressed by additions of lithium hydroxide at levels of 500 and 1000 ppm.

Figure 5:
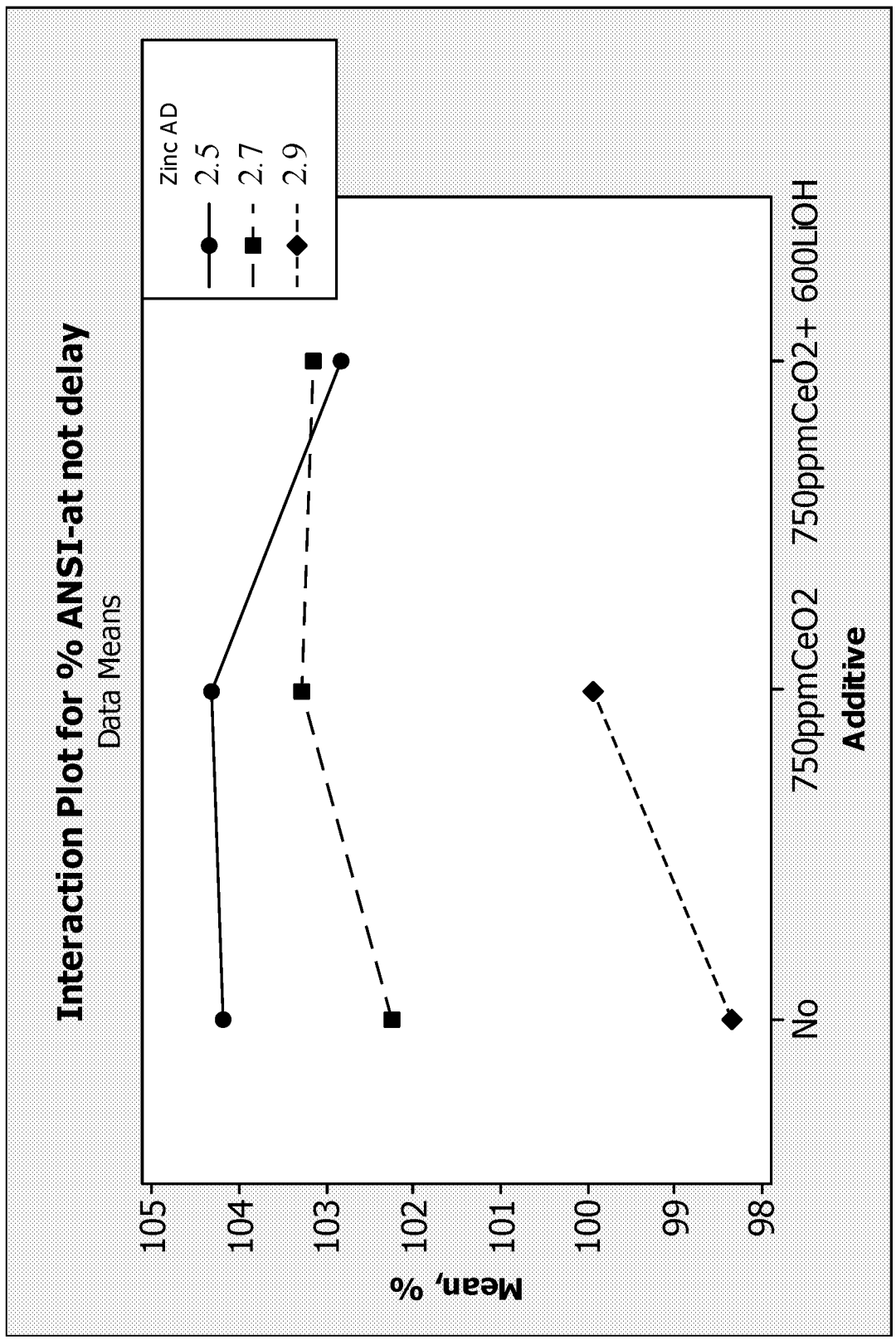
FIG. 5 illustrates the ANSI performance of LR6 cells containing cerium oxide additive alone or in combination lithium hydroxide.
Figure 6:
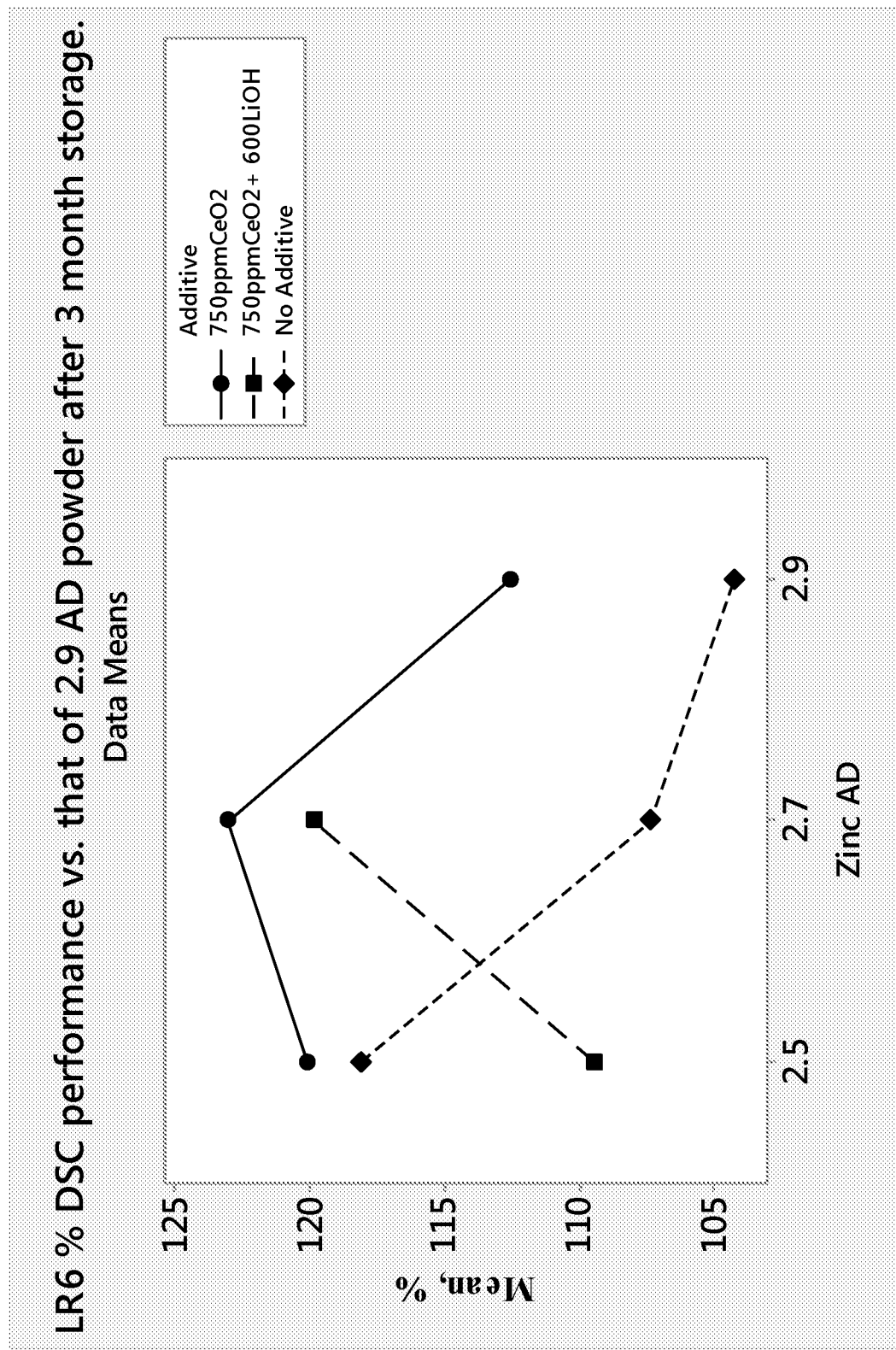
FIG. 6 is a graph illustrating the DSC performance of LR6 cells containing cerium oxide additive alone or in combination with lithium hydroxide after storage for 3 months.
Figure 7:
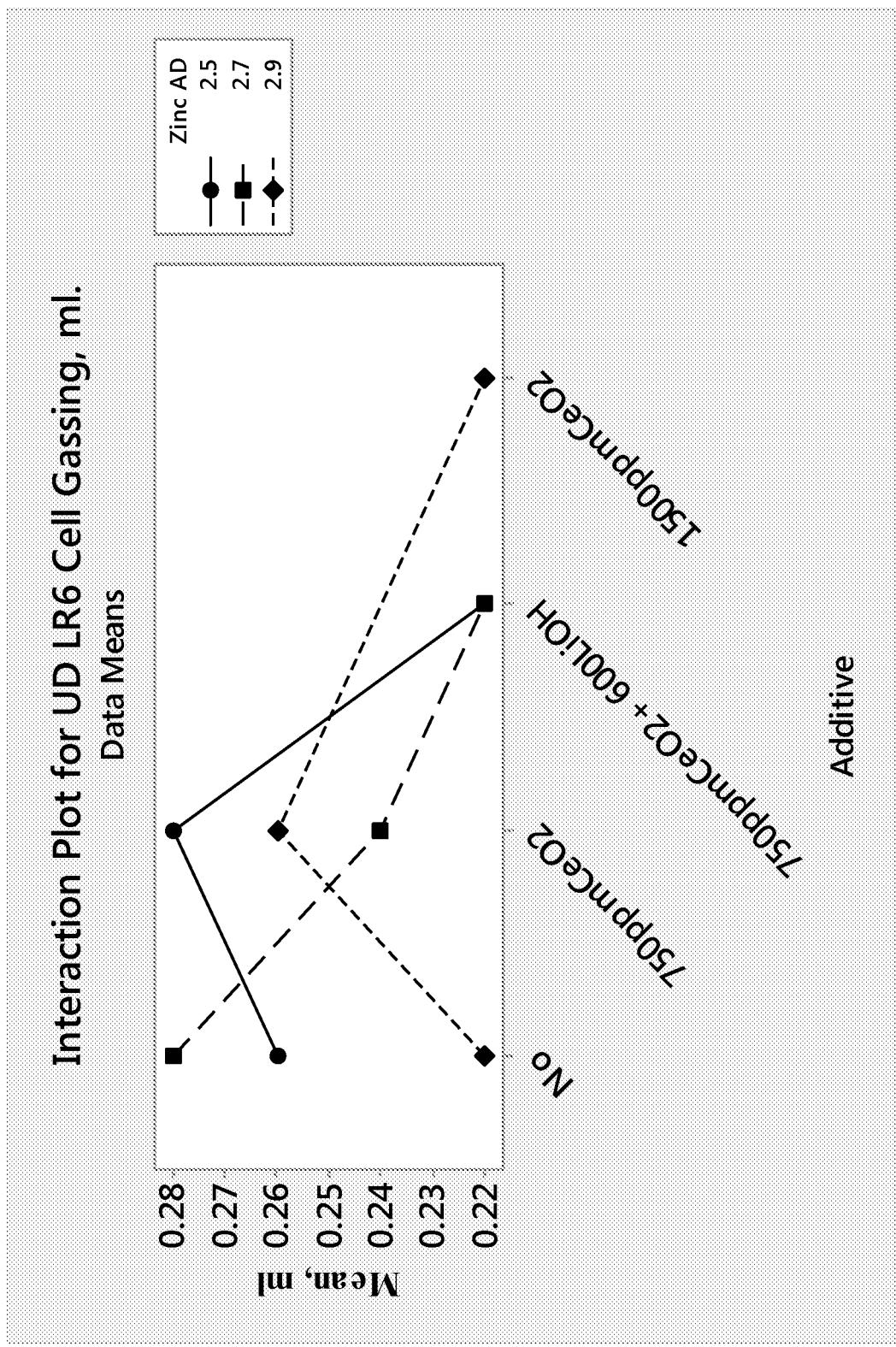
FIG. 7 is a graph illustrating the gassing characteristics for the undischarged (UD) LR6 cells having various additives and whose performance is illustrated in FIG. 5 and FIG. 6.
Figure 8:
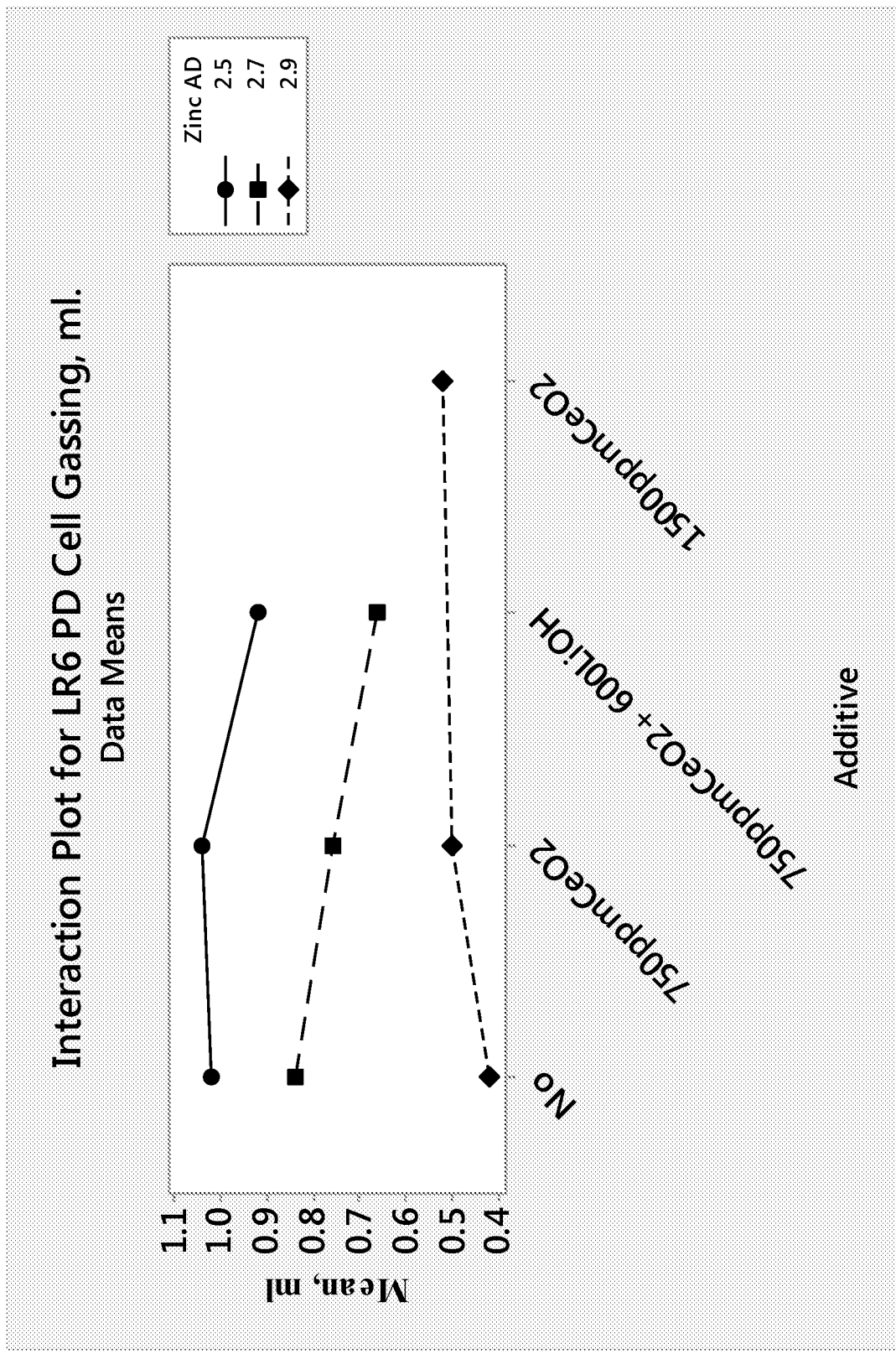
FIG. 8 is a graph illustrating the gassing characteristics for the partially discharged (PD) LR6 cells having various additives, as described in FIG. 5 and FIG. 6.

FIG. 5 and FIG. 6 display, respectively, the ANSI performance at no-delay (ND) and DSC performance after three months of storage at room temperature of LR6 cells added with cerium oxide (CeO$_2$) with or without lithium hydroxide in the anode gel. FIG. 7 and FIG. 8 illustrate undischarged (UD) cell gassing, and the partially discharged (PD) cell gassing, respectively, measured from LR6 cells described in FIG. 5 and FIG. 6. The respective gel KOH concentration was at 29% and the zinc loading was at 69%. The zinc alloy powder contained 120 ppm bismuth and 120 ppm indium. The impact of CeO$_2$ and lithium hydroxide additions were studied with three zinc powders having zinc apparent densities AD-1, AD-2, and AD-3, that is, at 2.50, 2.70, and 2.90 g/cc, respectively. The additives to the anode gel included lithium hydroxide at a concentration of 600 ppm and CeO$_2$ at a concentration of 750 ppm (additive 2). FIG. 5 indicates that the LR6 performance improved with the addition of 750 ppm of cerium oxide to the powders with apparent densities at 2.70 and 2.90 g/cc. No gain was seen with powder having apparent density at 2.50 g/cc. In the absence of additives, the performance of cells containing a zinc powder with apparent density at about 2.50 g/cc was the best relative to that of cells made with powders having densities at 2.70 and 2.90 g/cc. However, after storage for three months, the performance of cells having zinc with apparent density at 2.70 g/cc and containing 750 ppm of CeO$_2$, alone or with 750 ppm of LiOH, improved relative to that of cells without additives. Improvement in DSC is also seen in cells having zinc with apparent density at 2.90 g/cc and 750 ppm of CeO$_2$. Thus, cells with zinc powder of apparent density at 2.70 g/cc improved the most after storage, as seen in FIG. 6.

FIG. 7 displays the undischarged cell gassing of cells described according to FIG. 5 and FIG. 6. No significant factors are observed and the cell gassing ranges from 0.22 to 0.28 cc, irrespective of zinc apparent density or addition of cerium oxide or lithium hydroxide. FIG. 8 displays the corresponding partial discharge cell gassing. FIG. 8 indicates that partial discharge cell gassing is highest with zinc powders of lowest apparent densities. PD cell gassing was not significantly impacted by the presence of cerium oxide. A small tendency to decreased partial discharge cell gassing is seen in the presence of lithium hydroxide, particularly with cells having low apparent density powders.

Figure 9:
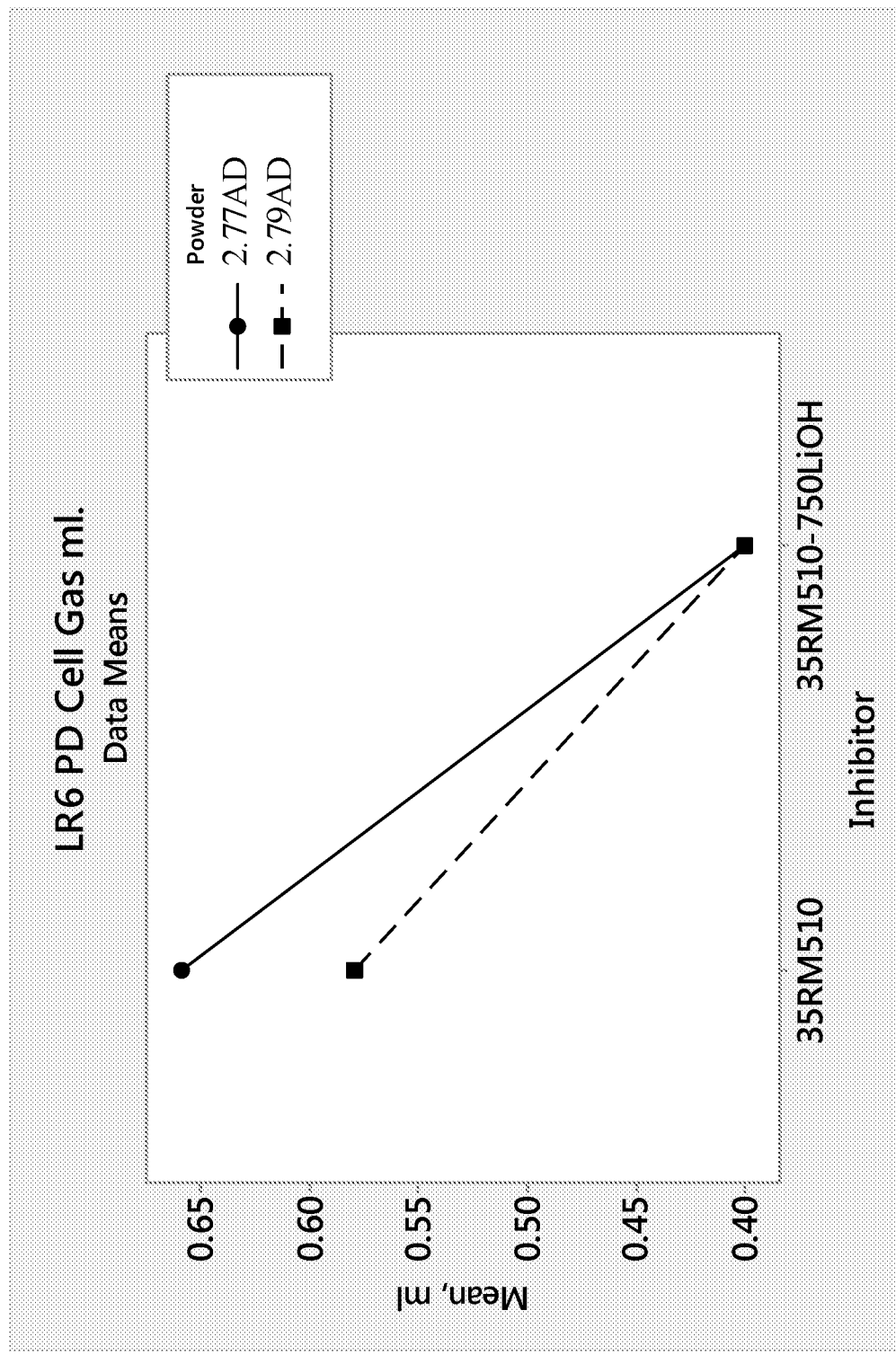
FIG. 9 is a graph illustrating partial discharge cell gassing of LR6 cells illustrating the impact of reduced cell gassing with lithium hydroxide addition.
Figure 10:
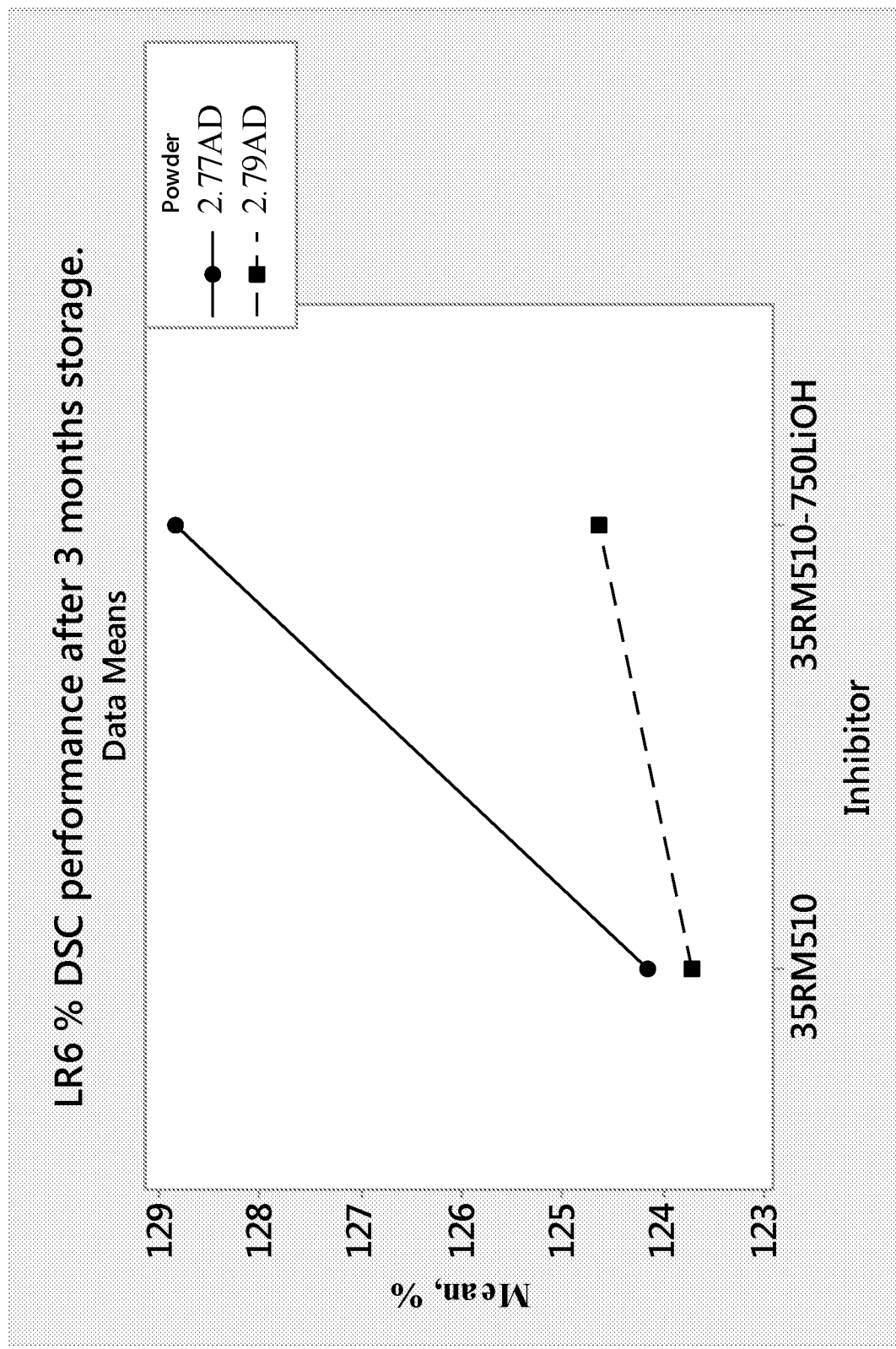
FIG. 10 displays the corresponding DSC performance of LR6 cells as described in FIG. 9.

FIG. 9 provides partial discharge (PD) cell gassing measured from LR6 cells stored at 160° F. for 1 week. The respective gel KOH concentration was at 26.5% and the zinc loading was at 71%. The cells were made with zinc powders of apparent densities at 2.77 and 2.79 g/cc. This figure shows that the cells having 35 ppm of Rhodafac® RM-510 in combination with 750 ppm of lithium hydroxide provided suppression in partial discharge cell gassing. No significant impact to the undischarged cell gassing was observed irrespective of the zinc powder or presence of additive. FIG. 10 shows the corresponding DSC performance of the cell described in FIG. 9 after storage for three months. The DSC performance in the presence of lithium hydroxide is at least equal to that of cells with no lithium hydroxide addition.

Figure 11:
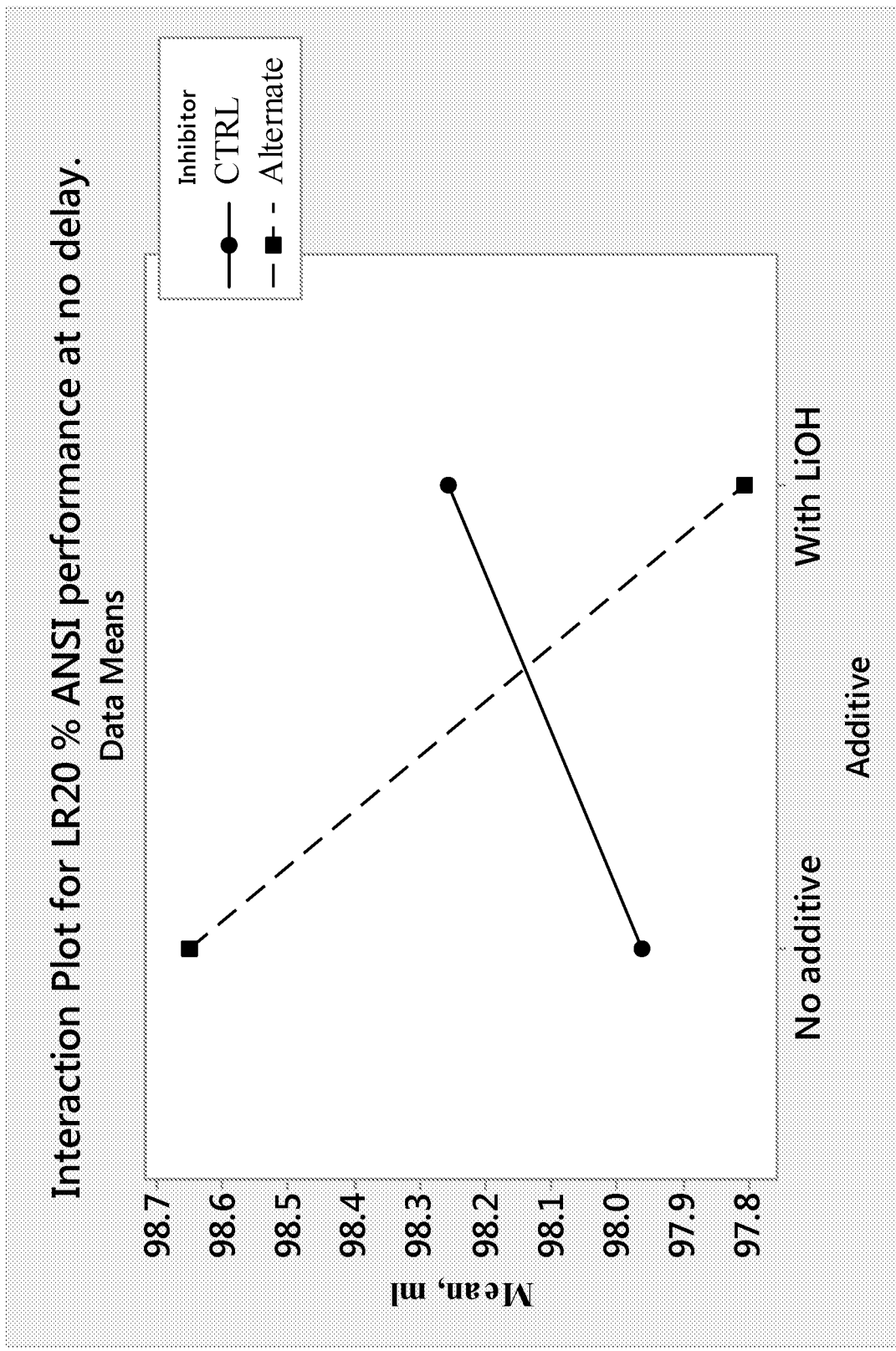
FIG. 11 displays the no-delay ANSI-performance of LR20 cells having lithium hydroxide with Rhodafac® RM-510 or Crodafos® SG-LQ as an alternate additive.

The anode gels of the LR20 cells, the ANSI performance for which is depicted in FIG. 11 had a zinc alloy containing 150 ppm of bismuth and 150 ppm of indium, and a zinc loading of 64%, relative to the weight of the gel. The conventional LR20 cells had no additive, as compared to the LR20 cells containing 2000 ppm of lithium hydroxide (LiOH) added as LiOH.H$_2$O. The control inhibitor (CTRL) was Rhodafac® RM-510 at 60 ppm and the alternate inhibitor was Crodafos® SG-LQ at 80 ppm by weight of gel. FIG. 11 shows that performance with the addition of lithium hydroxide was nearly unaffected with Rhodafac® RM-510, but it was suppressed by less than 1% when the alternate inhibitor was used in conjunction with lithium hydroxide.

Figure 12:
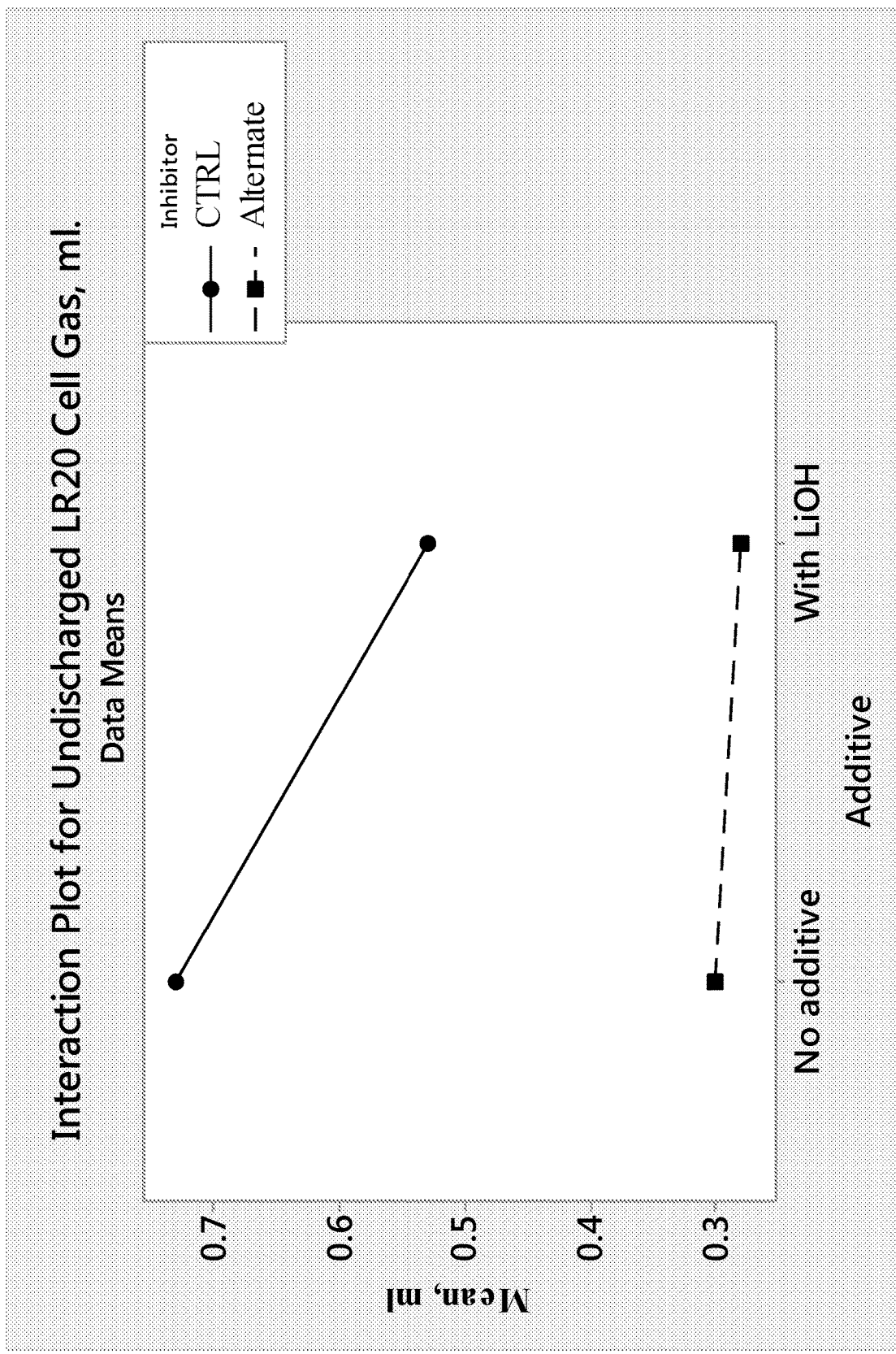
FIG. 12 is a graph illustrating the undischarged cell gassing of LR20 cells whose performance is described in FIG. 11.
Figure 13:
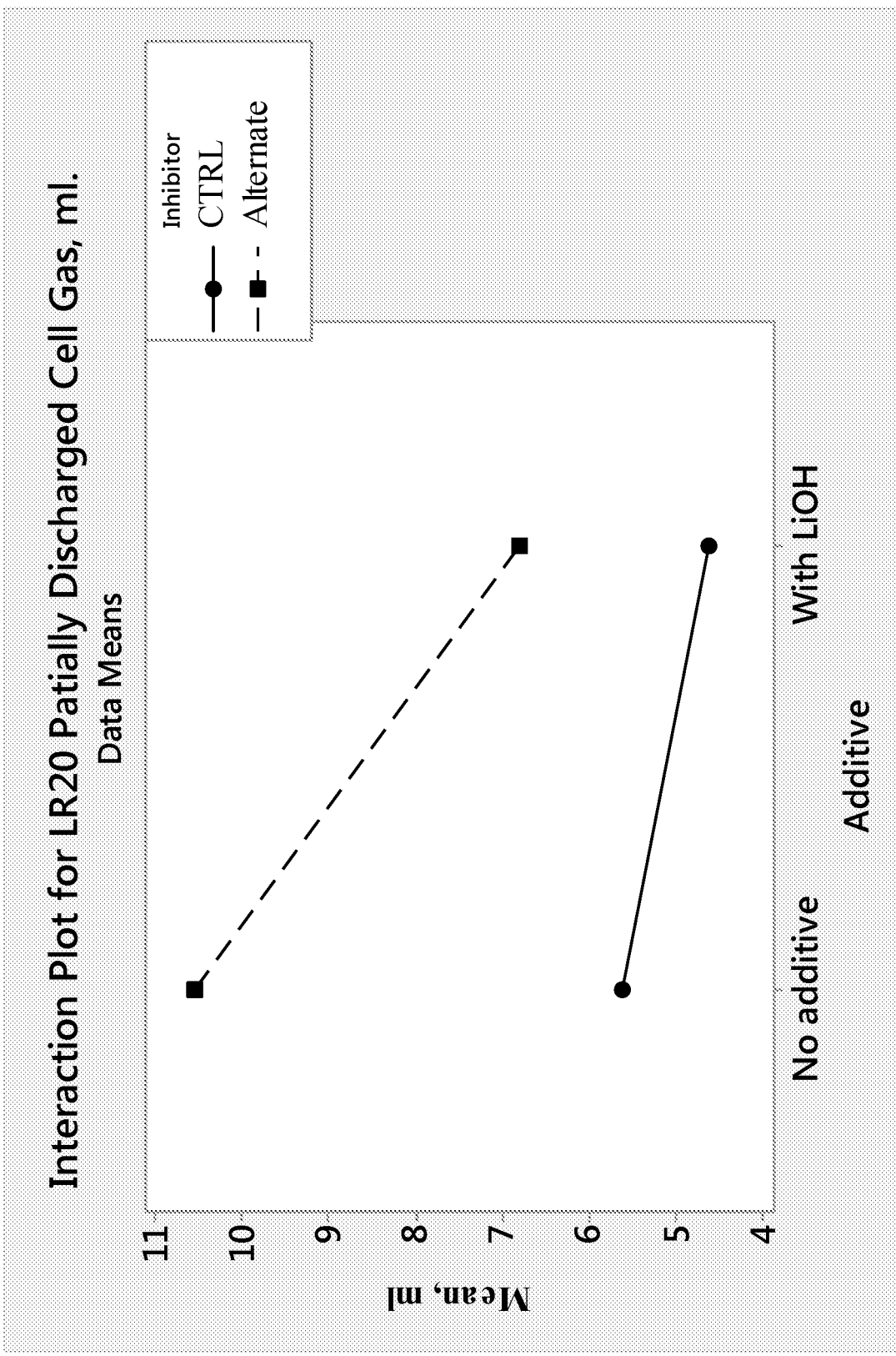
FIG. 13 is a graph illustrating the partial discharge cell gassing of LR20 cells whose performance is as described in FIG. 11.

FIG. 12 and FIG. 13 display undischarged and partially discharged cell gassing, respectively, of LR20 cells exhibiting the impact of lithium hydroxide addition to the cells as described in FIG. 11. The data in FIG. 12 and FIG. 13 indicates some decrease in cell gassing with the addition of lithium hydroxide, most noted after partial discharge of cells with the addition of Crodafos® SG-LQ (alternate inhibitor) and lithium hydroxide.

Figure 14:
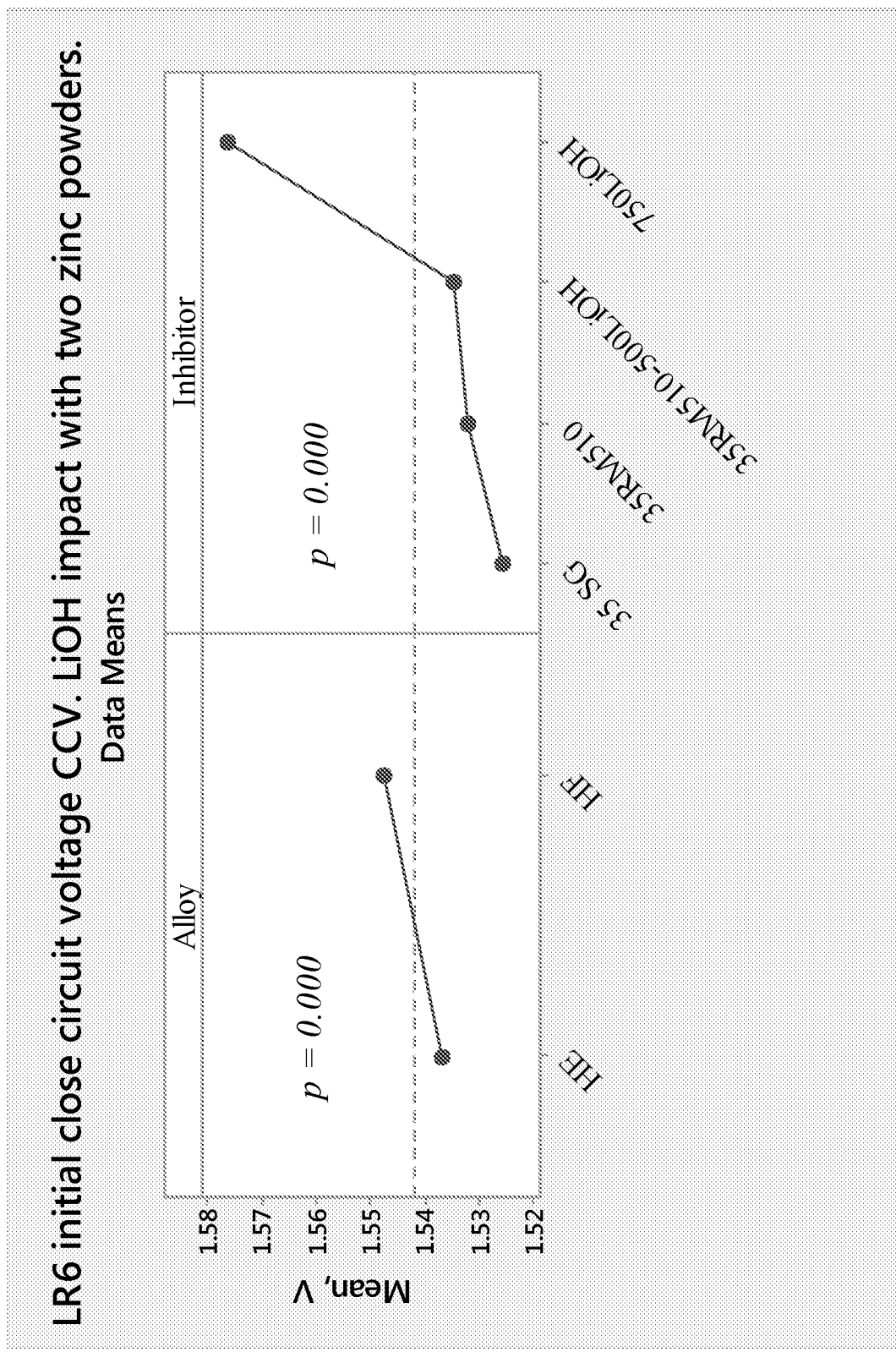
FIG. 14 depicts the impact of lithium hydroxide additive to the close circuit voltage of undischarged LR6 cells.
Figure 15:
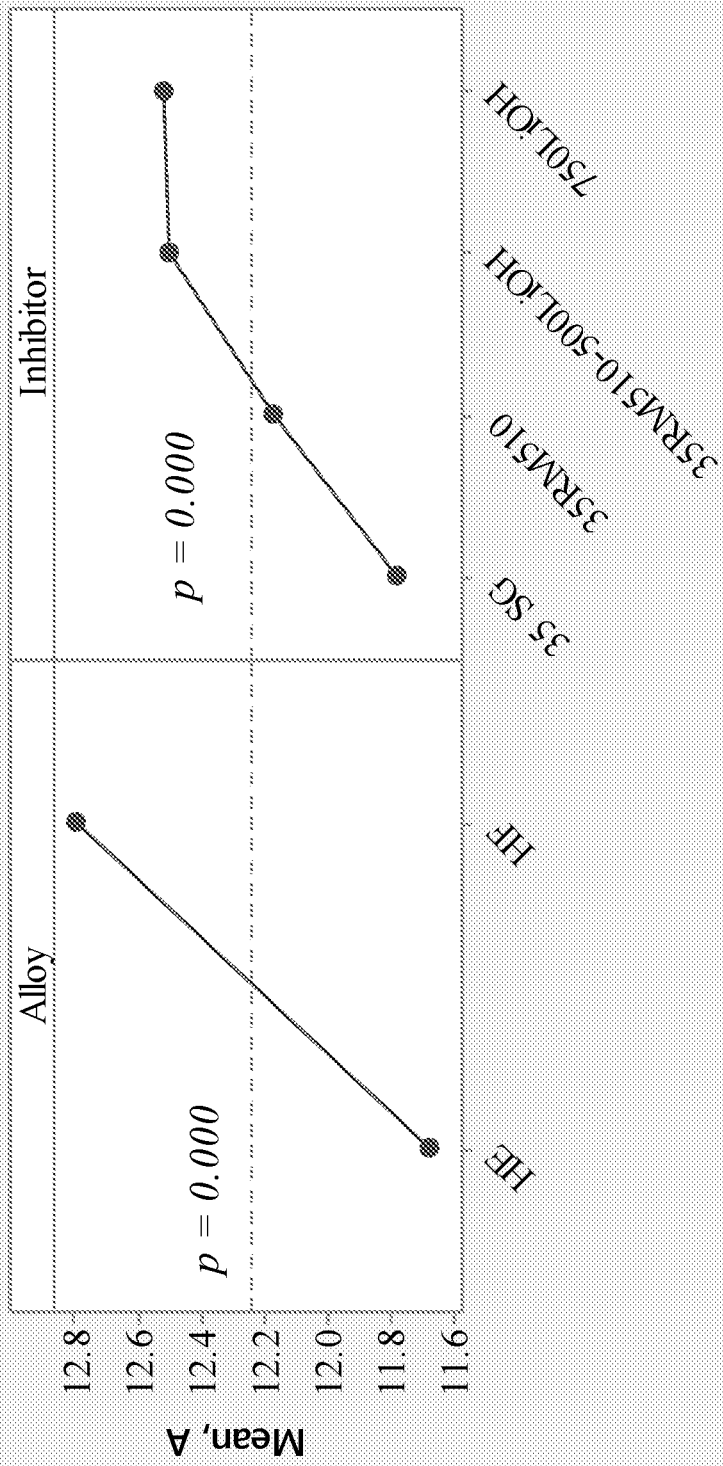
FIG. 15 depicts the impact of lithium hydroxide additive to the amperage of undischarged LR6 cells.
Figure 16:
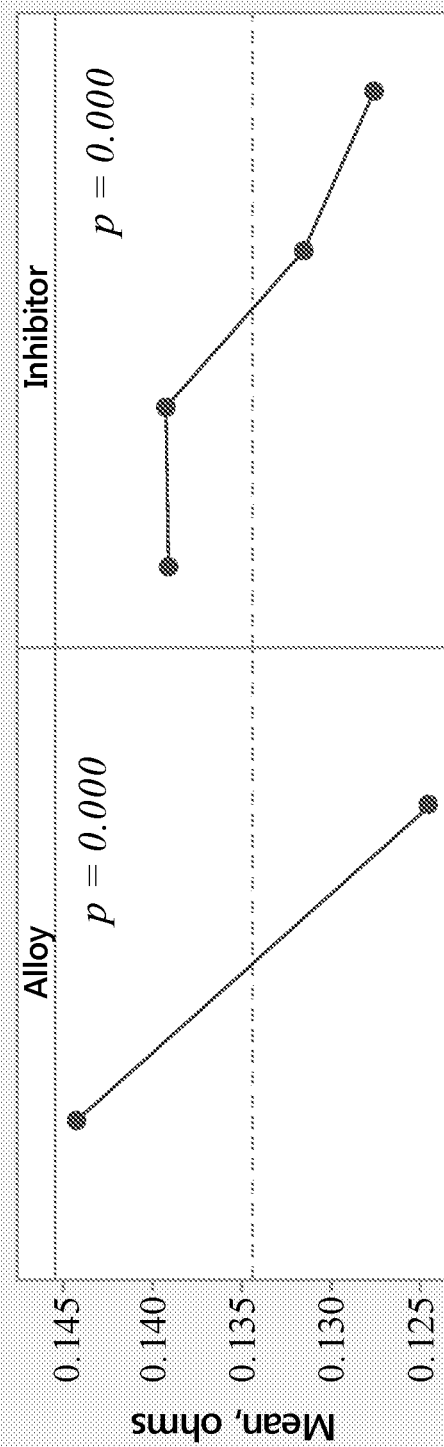
FIG. 16 depicts the impact of lithium hydroxide additive to the impedance of undischarged LR6 cells.

The impact of lithium hydroxide addition to LR6 cells on close circuit voltage ("CCV;" V), amperage (A), and impedance (ohms) of undischarged cells are shown in FIG. 14, FIG. 15, and FIG. 16, respectively. The corresponding LR6 gels were made with 26.5% KOH-2% ZnO solution and the zinc loading was at 70% Zn. The gel variations included gels with Rhodafac® RM-510 inhibitor, Crodafos® SG-LQ inhibitor, lithium hydroxide in combination with Rhodafac® RM-510, and lithium hydroxide without inhibitor. The inhibitors were used at a concentration of 35 ppm by weight of anode gel. Cells having lithium hydroxide contained 500 or 750 ppm of this additive. FIG. 14 shows that the CCV voltage increased when lithium hydroxide was added in conjunction with Rhodafac® RM-510 or alone. FIG. 15 shows that the addition of lithium hydroxide also induced a small increase in amperage. Another attribute to adding lithium hydroxide was also the lowering in cell impedance relative to cells not containing this additive, as seen in FIG. 16.

Figure 18:
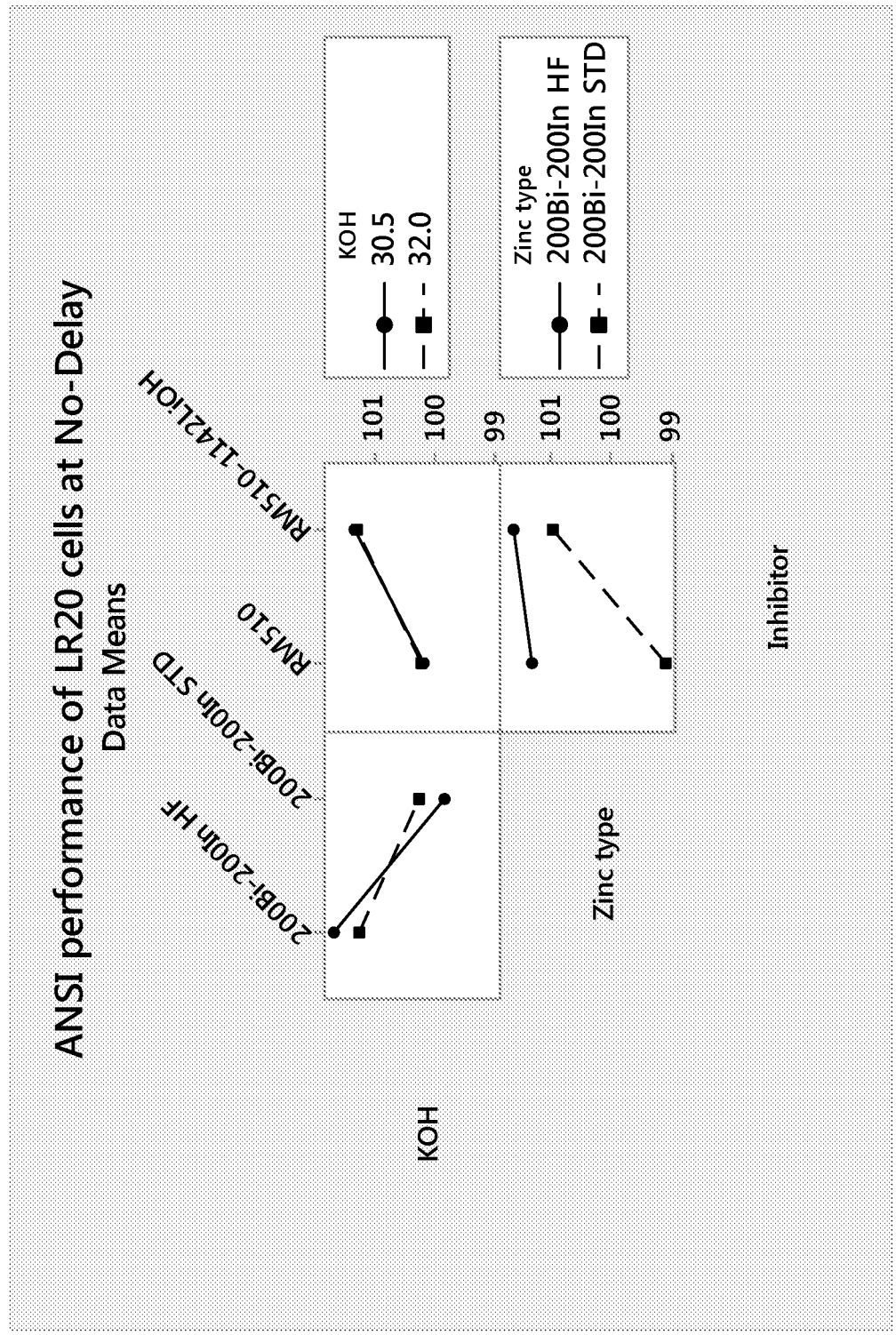
FIG. 18 is a graph illustrating the no-delay ANSI-performance of LR20 cells having lithium hydroxide with Rhodafac RM-510 and 200Bi-200In HF Zn alloy particles.

The anode gels of the LR20 cells described in FIG. 18 had a zinc loading of 63%, relative to the weight of the gel. The zinc powder had bismuth and indium as main alloying elements at a concentration of about 200 ppm and 200 ppm, respectively. The gel KOH concentration was tested at 30.5% and 32%. Lithium hydroxide was tested at a concentration of about 0 ppm and 1142 ppm and the corresponding Rhodafac® RM-510 concentration was tested at 60 ppm, to determine its impact on performance and reliability. The type of zinc-based particles labeled as 200Bi-200In HF (high fines) whose fines content is higher than that of conventional powders, labeled as 200Bi-200In STD (standard) zinc was also tested. The indium and bismuth content of both zinc powders were at 200 ppm, respectively. As seen from FIG. 18, in the presence of LiOH, the ANSI performance of cells having 1142 ppm LiOH increased relative to the cells having no LiOH. FIG. 18 also shows that that the performance is at nearly the same levels with 32% KOH and 30.5% KOH. Further, the ANSI performance of cells having HF Zn increased relative to the cells having STD zinc. The data in FIG. 18 indicates that the presence of STD zinc or HF zinc in combination with lithium hydroxide tends to provide improved ANSI performance. Thus, improved ANSI performance is anticipated at optimized levels of standard or HF zinc and lithium hydroxide.

Figure 19:
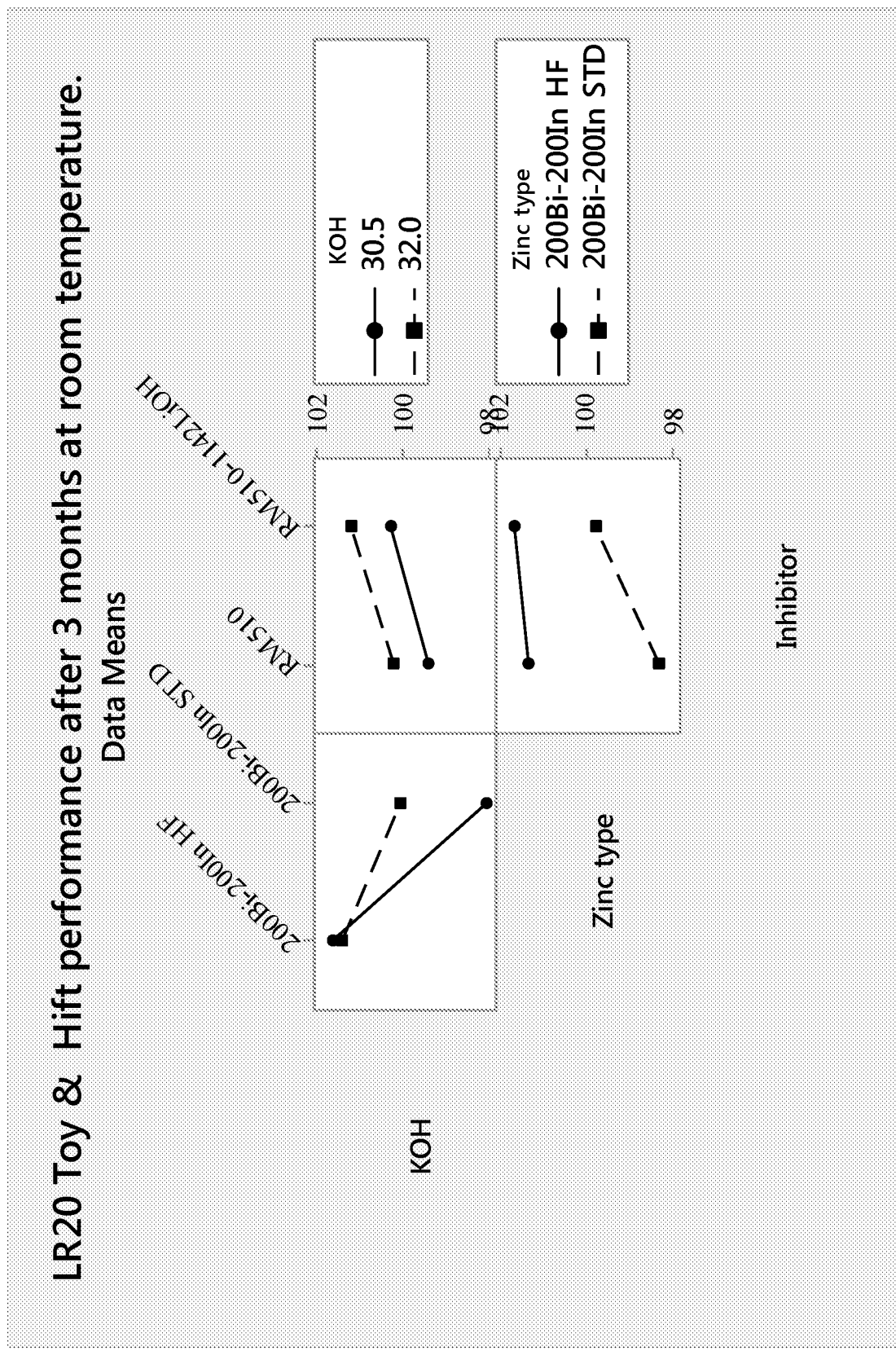
FIG. 19 is a graph of the discharge performance of LR20 cells in toy test and heavy industrial flashlight test (HIFT) after storage at room temperature for three months.
Figure 20:
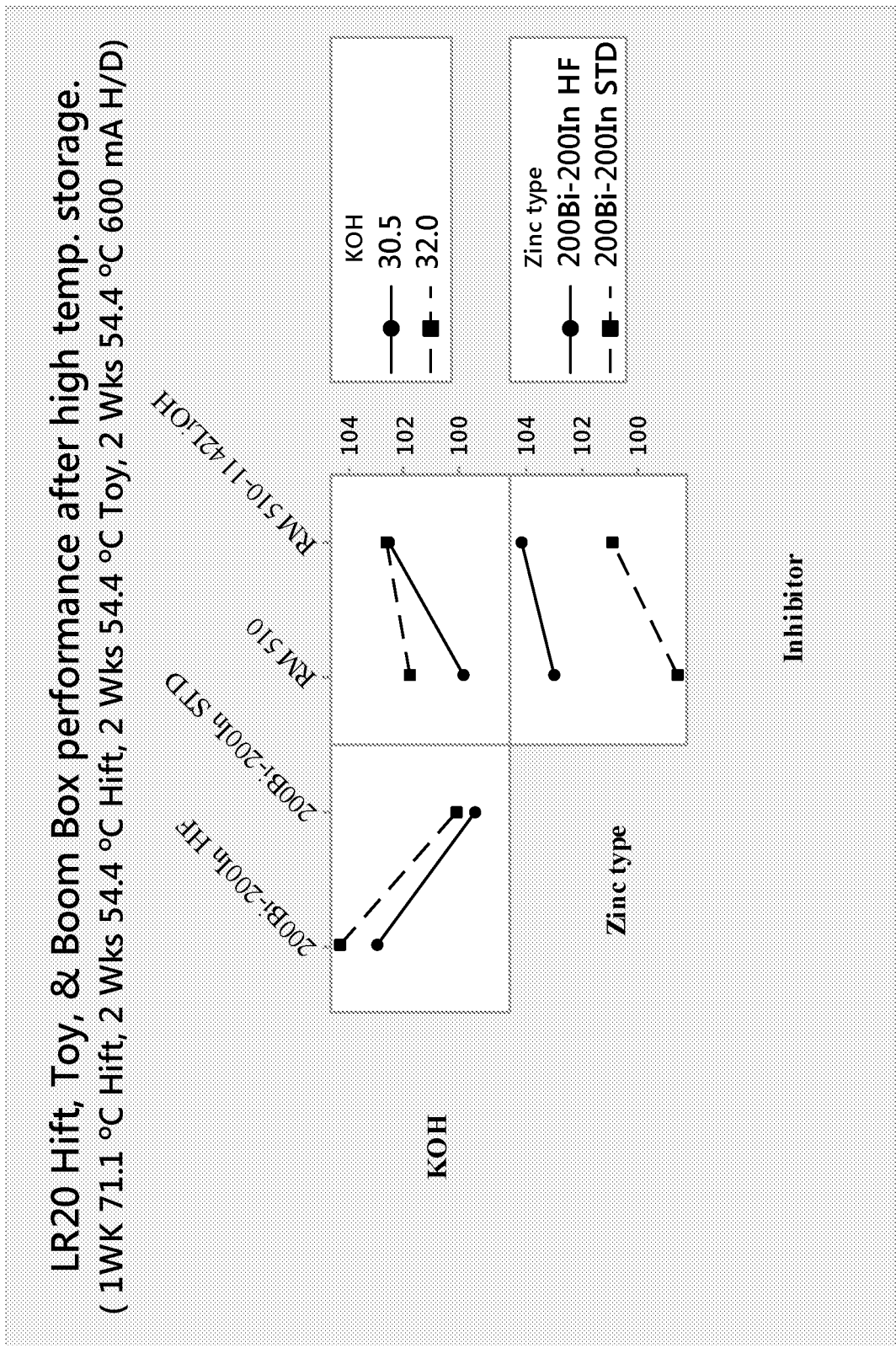
FIG. 20 is a graph of the discharge performance of LR20 cells in heavy industrial flashlight test (HIFT), toy test and boom box test after storage at 71.1° C., 54.4° C., and 54.4° C., respectively, for two weeks.

The LR20 batteries were discharged on the ASTM heavy industrial flashlight test (HIFT), which is 1.5 ohm, 4 minutes out of 15 minutes, 8 hours/day. The batteries were also discharged in a toy type test which was 2.2 ohm, 4 hours/day. The performance of LR20 batteries in toy and HIFT after 3 months at room temperature (21° C.) due to the variation in KOH concentration and presence of LiOH and HF Zn are shown in FIG. 19, resembling the trends observed in the ANSI performance described in FIG. 18. FIG. 20 illustrates the effect on performance of LR20 batteries with varying KOH concentration and presence of LiOH and HF Zn when tested in HIFT (1 week at 71.1° C. and 2 weeks at 54.4° C.), Toy (2 weeks at 54.4° C.) and Boom Box (2 weeks at 54.4° C.). FIG. 19 and FIG. 20 suggest that the performance is favored with HF zinc as well as with LiOH, at both room temperature and high temperature.

Figure 21:
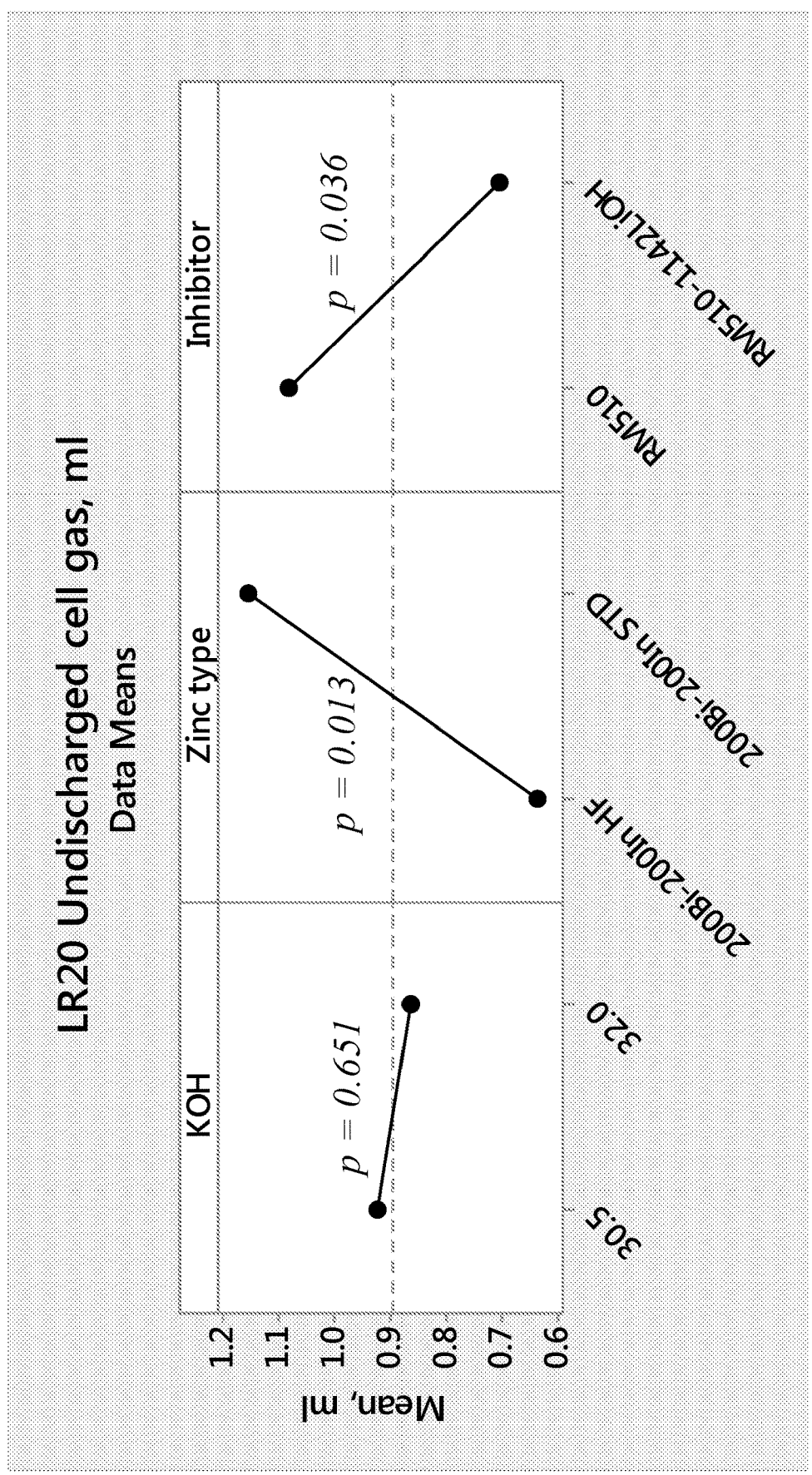
FIG. 21 is a graph illustrating the undischarged cell gassing of LR20 cells whose performance is described in FIG. 18.
Figure 22:
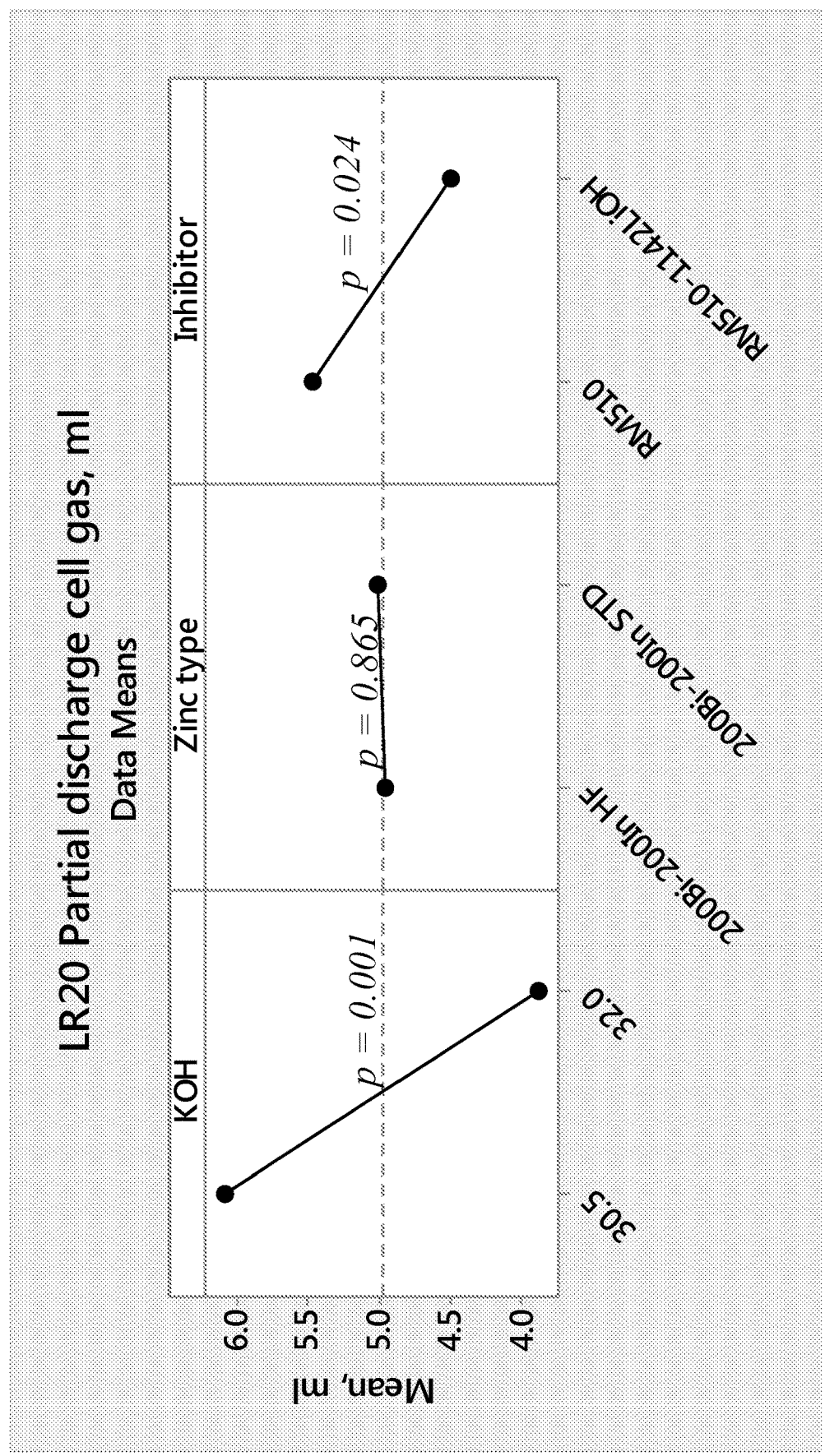
FIG. 22 is a graph illustrating the partial discharge cell gassing of LR20 cells whose performance is as described in FIG. 18.

The cell gassing results corresponding to the cell whose performance is described above are shown in FIG. 21 and FIG. 22. FIG. 21 shows cell gassing data from the LR20 alkaline cell described above for an undischarged cell after storage at 160° F. for 1 week in a dry oven. The corresponding partial cell gassing results are displayed in FIG. 22. Partial discharge for this cell size was carried out at a constant current of 600 mA for 11 hours. Both partially discharged and undischarged cells show statistically decreased cell gassing with the use of LiOH as well as with the use of HF zinc, as denoted by the low p value, both factors having p values below 0.050.

Figure 24:
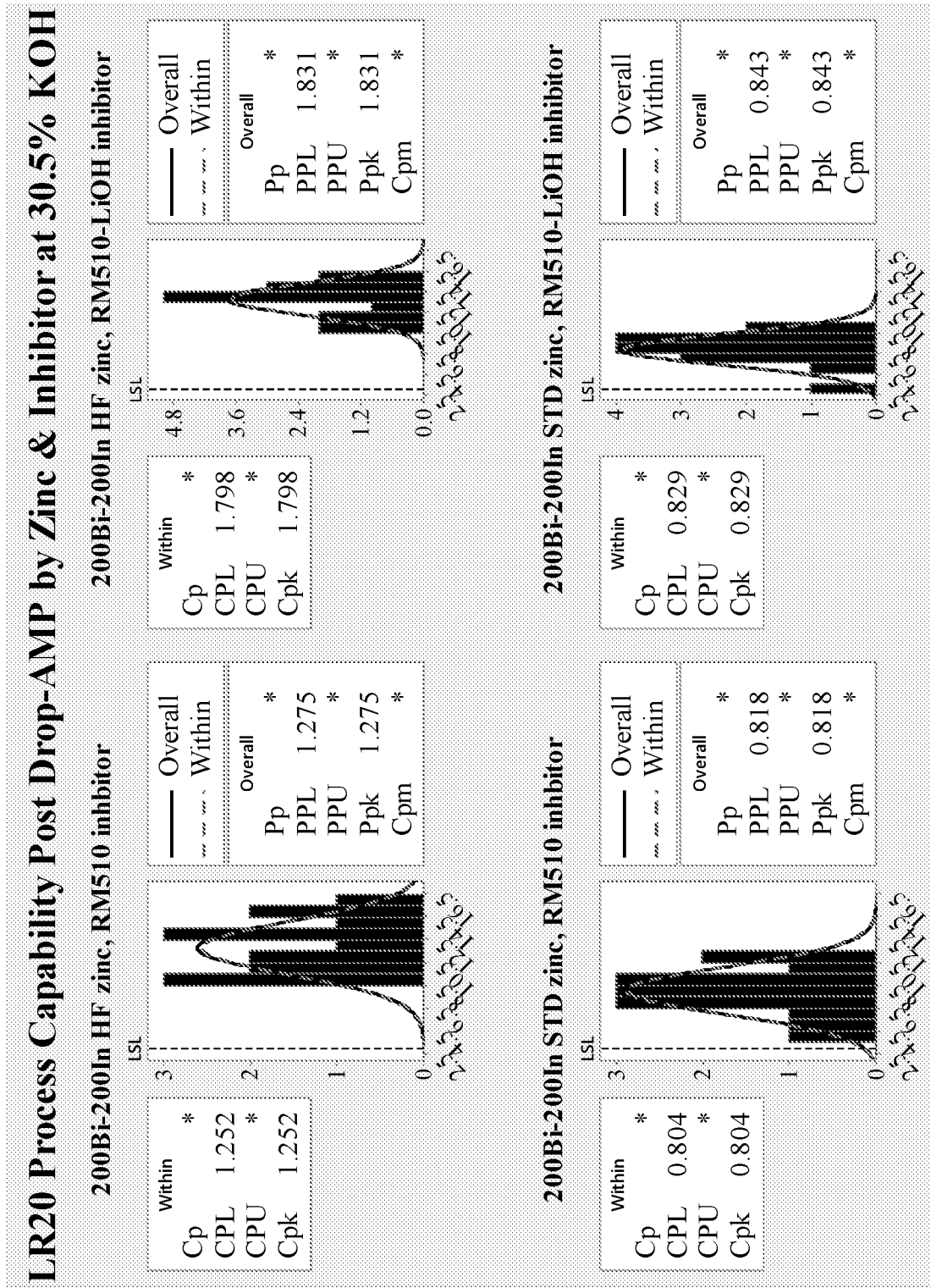
FIG. 24 illustrates the post-drop amp data of LR20 cells containing 30% KOH having lithium hydroxide with Rhodafac® RM-510, and 200Bi-200In STD or 200Bi-200In HF Zn alloy particles.

FIG. 23 shows the post-drop amp data of LR20 cells containing 32% KOH made with STD and HF zinc. It is observed that the addition of 1140 ppm of LiOH to the anode gel induces an improvement in the cell post-drop amperage distribution, particularly in the presence of HF zinc, as seen by the increased Ppk value. [Ppk is the statistical process capability of a data set based on the overall standard deviation ($\delta$). The higher the value, the better the distribution: Ppk=PPL=[($\mu$–LSL/3$\delta$ overall)]. FIG. 24 shows that the addition of LiOH to LR20 cells made with 30.5% KOH improves the amperage distribution to higher values and thus enhances resistance to the Drop test failure, in agreement with the results shown at 32% KOH. FIGS. 23 and 24 display as a reference a low specification limit (LSL) of 3 A to pass the drop test.

The present technology recognizes that the use of one, two, or more additives selected from the group consisting of an alkali metal hydroxide, an organic phosphate ester surfactant, a metal oxide, and tin enhances cell amperage, close circuit voltage, as well as reduces cell impedance. Also, reduced cell gassing, such as after partial discharge is seen with additives such as lithium hydroxide alone or in conjunction with Rhodafac® RM-510 or SG-LQ inhibitors. Without being bound by theory, it is believed that lithium hydroxide modifies the composition of the passivating layer on the zinc particle surface, resulting in better protection and less corrosion of zinc in the alkaline battery environment. However, in using lithium hydroxide alone, the high rate performance (DSC) results in small cell (LR6) are suppressed. These high rate (DSC) performances can be improved by adding other additives such as cerium oxide, tin metal, or organic phosphate ester surfactant in the gel anode. These additives can improve the zinc particle to particle contact in the gel anode during discharge, without adversely affecting cell gassing. By addition of combinations of these additives, for example cerium oxide and lithium hydroxide or tin and lithium hydroxide in the anode gel, the cell gassing is further suppressed compared to control cells free of these additives, leading to improved cell reliability during high temperature storage and the high rate DSC performance is maintained.

The invention is further defined by the following embodiments:

Embodiment A. A gelled anode for an alkaline electrochemical cell, the anode comprising: zinc-based particles, an alkaline electrolyte, a gelling agent, and two or more additives selected from the group consisting of an alkali metal hydroxide, an organic phosphate ester surfactant, a metal oxide, and tin.

Embodiment B. The gelled anode of Embodiment A, comprising the alkali metal hydroxide, wherein the alkali metal hydroxide is lithium hydroxide.

Embodiment C. The gelled anode of any one of Embodiments A-B, comprising the alkali metal oxide, wherein the metal oxide is cerium oxide.

Embodiment D. The gelled anode of any one of Embodiments A-C, wherein the additive comprises lithium hydroxide and a phosphate ester surfactant.

Embodiment E. The gelled anode of any one of Embodiments A-D, wherein the additive comprises lithium hydroxide and cerium oxide.

Embodiment F. The gelled anode of any one of Embodiments A-E, wherein the additive comprises lithium hydroxide and tin.

Embodiment G. The gelled anode of any one of Embodiments A-F, wherein the additive comprises lithium hydroxide, cerium oxide, and tin.

Embodiment H. The gelled anode of any one of Embodiments F-G, wherein the organic phosphate ester surfactant is selected from the group consisting of poly(oxy-1,2-ethanediyl),-a-(dinonylphenyl)-w-hydroxy-, phosphate, polyoxyethylene tridecyl ether phosphate, poly(oxy-1,2-ethanediyl),-a-hydro-w-hydroxy-, $C_{8-10}$-alkyl ether phosphate, polyoxyethylene isotridecyl phosphate, polyoxypropylene polyoxyethylene cetyl ether, $C_{10}$-$C_{14}$ alcohol ethoxylate phosphate ester, tridecyl alcohol ethoxylate phosphate ester, and nonylphenol ethoxylate phosphate ester.

Embodiment I. The gelled anode of any one of Embodiments F-H, wherein the lithium hydroxide is present at a concentration from about 0.02 wt % to about 0.2 wt % relative to the total weight of the gelled anode mixture.

Embodiment J. The gelled anode of any one of Embodiments A-I, wherein the cerium oxide is present at a concentration from about 0.05 wt % to about 0.2 wt % relative to the total weight of the gelled anode mixture.

Embodiment K. The gelled anode of any one of Embodiments A-J, wherein the organic phosphate ester surfactant is present at a concentration from about 0.001 wt % to about 0.015 wt % relative to the total weight of the gelled anode mixture.

Embodiment L. The gelled anode of any one of Embodiments A-K, wherein tin is present at a concentration of from about 0.05 wt % to about 0.2 wt % relative to the total weight of the gelled anode mixture.

Embodiment M. The gelled anode of any one of Embodiments A-L, wherein the zinc-based particles are zinc alloy particles.

Embodiment N. The gelled anode of Embodiment M, wherein the zinc alloy comprises about 100 ppm to about 280 ppm of bismuth, and about 100 ppm to about 280 ppm of indium.

Embodiment O. The gelled anode of Embodiments M or N, wherein from about 20% to about 50%, by weight relative to a total weight of zinc alloy has a particle size of less than about 75 micrometers.

Embodiment P. The gelled anode of Embodiment O, wherein about 20% to about 40% by weight relative to the total weight of zinc alloy has a particle size of less than about 75 microns, and about 8% to about 20% by weight relative of the total weight of zinc alloy has a particle size of greater than about 150 micrometers.

Embodiment Q. An alkaline electrochemical cell comprising a positive current collector; a cathode in contact with the positive current collector; a gelled anode comprising zinc-based particles, alkaline electrolyte, a gelling agent, and two or more additives selected from the group consisting of an alkali metal hydroxide, an organic phosphate ester surfactant, a metal oxide and tin; a separator between the cathode and the anode; and a negative current collector in electrical contact with the anode.

Embodiment R. The alkaline electrochemical cell of Embodiment Q, wherein the alkaline electrolyte comprises potassium hydroxide.

Embodiment S. The alkaline electrochemical cell of Embodiment Q or R, wherein the alkali metal hydroxide is lithium hydroxide.

Embodiment T. The alkaline electrochemical cell of any one of Embodiments Q-S, wherein the metal oxide is cerium oxide.

Embodiment T'. The alkaline electrochemical cell of any one of Embodiments Q-T' wherein the additive comprises lithium hydroxide and a phosphate ester surfactant.

Embodiment U. The alkaline electrochemical cell of any one of Embodiments Q-T, wherein the additive includes lithium hydroxide and a cerium oxide.

Embodiment V. The alkaline electrochemical cell of any one of Embodiments Q-U, wherein the additive includes lithium hydroxide and tin.

Embodiment W. The alkaline electrochemical cell of any one of Embodiments Q-V, wherein the additive includes lithium hydroxide, cerium oxide and tin.

Embodiment X. The alkaline electrochemical cell of any one of Embodiments Q-W, wherein the phosphate ester surfactant is poly(oxy-1,2-ethanediyl),-a-(dinonylphenyl)-w-hydroxy-, phosphate.

Embodiment Y. The alkaline electrochemical cell of any one of Embodiments Q-X, which exhibit a gassing reduction from about 10% to about 60% compared to alkaline electrochemical cells that do not have in the gelled anode two or more additives selected from the group consisting of an alkali metal hydroxide, an organic phosphate ester surfactant, a metal oxide, and tin.

Embodiment Z. The alkaline electrochemical cell of any one of Embodiments Q-Y, wherein the zinc-based particles are zinc alloy particles.

Embodiment AA. The alkaline electrochemical cell of Embodiment Z, wherein the zinc alloy comprises about 100 ppm to about 280 ppm of bismuth, and about 100 ppm to about 280 ppm of indium.

Embodiment BB. The alkaline electrochemical cell of Embodiment AA, wherein from about 20% to about 50%, by weight relative to a total weight of zinc alloy has a particle size of less than about 75 micrometers.

Embodiment CC. The alkaline electrochemical cell of Embodiment BB, wherein about 20% to about 40% by weight, relative to the total weight of zinc alloy has a particle size of less than about 75 microns, and about 8% to about 20% by weight relative of the total weight of zinc alloy has a particle size of greater than about 150 micrometers.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A gelled anode for a primary alkaline electrochemical cell, the anode comprising:
    zinc-based particles, an alkaline electrolyte comprising potassium hydroxide or sodium hydroxide, a gelling agent, lithium hydroxide, and tin metal powder; wherein lithium hydroxide is present at a concentration from about 0.005 wt % to about 5 wt % relative to the total weight of the gelled anode; and wherein tin metal powder is present at a concentration of from about 0.0001 wt % to about 0.15 wt % relative to the total weight of the gelled anode.

2. The gelled anode of claim 1, further comprising a phosphate ester surfactant selected from the group consisting of poly(oxy-1,2-ethanediyl)-α-(dinonylphenyl)-ω-hydroxy-phosphate, polyoxyethylene tridecyl ether phosphate, poly(oxy-1,2-ethanediyl)-α-hydro-ω-hydroxy-$C_{8-10}$-alkyl ether phosphate, polyoxyethylene isotridecyl phosphate, polyoxypropylene polyoxyethylene cetyl ether, $C_{10}$-$C_{14}$ alcohol ethoxylate phosphate ester, tridecyl alcohol ethoxylate phosphate ester, and nonylphenol ethoxylate phosphate ester.

3. The gelled anode of claim 1, wherein relative to the total weight of the gelled anode, the lithium hydroxide is present at a concentration from about 0.02 wt % to about 0.2 wt %, cerium oxide is present at a concentration from about 0.05 wt % to about 0.2 wt %, phosphate ester surfactant is present at a concentration from about 0.001 wt % to about 0.015 wt %, and the tin metal powder is present at a concentration of from about 0.05 wt % to about 0.15 wt %.

4. The gelled anode of claim 1, wherein the zinc-based particles are zinc alloy particles comprising about 100 ppm to about 280 ppm of bismuth, and about 100 ppm to about 280 ppm of indium.

5. The gelled anode of claim 4, wherein from about 20% to about 50%, of the zinc alloy, by weight relative to a total weight of zinc alloy, has a particle size of less than about 75 micrometers.

6. The gelled anode of claim 4, wherein about 20% to about 40% of the zinc alloy, by weight relative to the total weight of zinc alloy, has a particle size of less than about 75 micrometers, and about 8% to about 20% of the zinc alloy, by weight relative to the total weight of zinc alloy, has a particle size of greater than about 150 micrometers.

7. The gelled anode of claim 1, wherein the alkaline electrolyte comprises potassium hydroxide.

8. The gelled anode of claim 1, wherein the alkaline electrolyte comprises potassium hydroxide at a concentration of less than about 40%.

9. A primary alkaline electrochemical cell comprising:
    a positive current collector;
    a cathode in contact with the positive current collector;
    a gelled anode comprising zinc-based particles, an alkaline electrolyte comprising potassium hydroxide or sodium hydroxide, a gelling agent, lithium hydroxide, and tin metal powder;
    a separator between the cathode and the anode; and
    a negative current collector in electrical contact with the anode;
        wherein lithium hydroxide is present at a concentration from about 0.005 wt % to about 5 wt % relative to the total weight of the gelled anode; and
        wherein tin metal powder is present at a concentration of from about 0.0001 wt % to about 0.15 wt % relative to the total weight of the gelled anode.

10. The primary alkaline electrochemical cell of claim 9, wherein the alkaline electrolyte comprises potassium hydroxide.

11. The primary alkaline electrochemical cell of claim 9, wherein the gelled anode further comprises poly(oxy-1,2-ethanediyl)-a-(dinonylphenyl)-ω-hydroxyphosphate.

12. The primary alkaline electrochemical cell of claim 9, wherein the zinc-based particles are zinc alloy particles.

13. The primary alkaline electrochemical cell of claim 12, wherein the zinc alloy comprises:
    about 100 ppm to about 280 ppm of bismuth; and
    about 100 ppm to about 280 ppm of indium.

14. The primary alkaline electrochemical cell of claim 13, wherein from about 20% to about 50% of the zinc alloy, by weight relative to a total weight of zinc alloy, has a particle size of less than about 75 micrometers.

15. The primary alkaline electrochemical cell of claim 14, wherein about 20% to about 40% of the zinc alloy, by weight relative to the total weight of zinc alloy, has a particle size of less than about 75 micrometers, and about 8% to about 20% of the zinc alloy, by weight relative to the total weight of zinc alloy, has a particle size of greater than about 150 micrometers.

16. The primary alkaline electrochemical cell of claim 9, wherein the alkaline electrolyte comprises potassium hydroxide at a concentration of less than about 40%.

* * * * *

UNITED STATES PATENT AND TRADEMARK OFFICE
CERTIFICATE OF CORRECTION

PATENT NO. : 11,133,497 B2
APPLICATION NO. : 15/573427
DATED : September 28, 2021
INVENTOR(S) : Armacanqui et al.

It is certified that error appears in the above-identified patent and that said Letters Patent is hereby corrected as shown below:

In the Claims

Column 22,
Lines 53 and 54, "poly(oxy-1,2-ethanediyl)-a-(dinonylphenyl)-ω-hydroxyphosphate" should read
--poly(oxy-1,2-ethanediyl)-α-(dinonylphenyl)-ω-hydroxyphosphate--.

Signed and Sealed this
Twenty-third Day of August, 2022

Katherine Kelly Vidal
*Director of the United States Patent and Trademark Office*